(12) United States Patent
Cho

(10) Patent No.: US 11,012,211 B2
(45) Date of Patent: May 18, 2021

(54) METHOD FOR TRANSMITTING REFERENCE SIGNAL AND APPARATUS USING THE SAME

(71) Applicant: Jaihyung Cho, Daejeon (KR)

(72) Inventor: Jaihyung Cho, Daejeon (KR)

( * ) Notice: Subject to any disclaimer, the term of this patent is extended or adjusted under 35 U.S.C. 154(b) by 43 days.

(21) Appl. No.: 16/594,669

(22) Filed: Oct. 7, 2019

(65) Prior Publication Data

US 2021/0105112 A1    Apr. 8, 2021

(51) Int. Cl.
*H04L 5/00* (2006.01)
*H04L 27/26* (2006.01)

(52) U.S. Cl.
CPC .......... *H04L 5/0048* (2013.01); *H04L 5/0007* (2013.01); *H04L 27/2613* (2013.01); *H04L 27/2628* (2013.01)

(58) Field of Classification Search
CPC ................. H04B 7/2121; H04B 7/2123; H04J 2203/0069; H04Q 2213/394; H04W 72/04; H04W 72/12; H04W 76/00; H04W 27/2613; H04L 5/0048; H04L 27/2628; H04L 5/0007

USPC ........................................................ 370/329
See application file for complete search history.

(56) References Cited

U.S. PATENT DOCUMENTS

| | | | |
|---|---|---|---|
| 2011/0292826 A1* | 12/2011 | Ahn ................. | H04W 52/16 370/252 |
| 2012/0008585 A1* | 1/2012 | Kwon ............... | H04L 1/1861 370/329 |
| 2018/0167935 A1* | 6/2018 | Yan .................. | H04L 5/0094 |
| 2019/0305901 A1* | 10/2019 | Opshaug .......... | H04W 72/042 |
| 2020/0275416 A1* | 8/2020 | Haghighat ........ | H04B 7/0628 |

* cited by examiner

*Primary Examiner* — Robert J Lopata
(74) *Attorney, Agent, or Firm* — IPLA P.A.; James E. Bame

(57) ABSTRACT

A reference signal transmission method performed by at least one base station, the method including: determining a sequence of a reference signal; performing an inverse Fourier transform (IFT) based on the determined sequence of the reference signal; and transmitting a reference signal generated by performing the IFT through a plurality of continuous symbols. The sequence of the reference signal is determined to satisfy a condition that each of at least one subcarrier signal included in the reference signal continues in a boundary between adjacent two symbols.

20 Claims, 22 Drawing Sheets

METHOD FOR TRANSMITTING REFERENCE SIGNAL AND APPARATUS USING THE SAME

BACKGROUND

The present disclosure of the following description relates to a method and apparatus for transmitting a reference signal, and a method of determining a sequence of a reference signal.

A communication system may include a core network, for example, a mobility management entity (MME), a serving gateway (SGW), a packet data network (PDN) gateway (PGW), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

In a communication system, a UE may generally transmit and receive data through a base station. For example, if data to be transmitted to a second UE is present, a first UE may generate a message including the data to be transmitted to the second UE and may transmit the generated message to a first base station to which the first UE belongs. The first base station may receive the message from the first UE and may verify that a destination of the received message is the second UE. The first base station may transmit the message to a second base station to which the verified destination, that is, the second UE belongs. The second base station may receive the message from the first base station and may verify that the destination of the received message is the second UE. The second base station may transmit the message to the verified destination, that is, the second UE. The second UE may receive the message from the second base station and may acquire the data included in the received message.

A reference signal may be transmitted and received between a UE and a base station. The reference signal may be used for various purposes. For example, the UE or the base station may perform synchronization or may estimate a position of the UE using the reference signal. As one of positioning methods using RAT, the UE may estimate a position of the UE by measuring a difference in time of arrival (ToA) between positioning reference signals (PRSs) received from a plurality of base stations. In this case, the UE may need to independently measure each of the positioning reference signals received from the plurality of base stations. Therefore, each of the base stations may transmit a positioning reference signal using a different resource element.

A conventional reference signal may be discontinuous in a boundary between symbols due to characteristics of orthogonal frequency division multiplex (OFDM). The UE may move a fast Fourier transform (FFT) window within a single OFDM symbol to analyze a received signal. Since a degree of freedom (DoF) that allows the UE to move or shift the FFT window is limited, it is difficult to acquire a sufficient number of snapshot vectors to analyze a reference signal. In addition, if an FFT window of the UE is deviated from a valid period of a symbol, subcarrier orthogonality may not be guaranteed or an amount of information that the UE may acquire from the reference signal may decrease.

SUMMARY OF THE INVENTION

At least one example embodiment provides a reference signal transmission method that may determine a sequence of a reference signal.

At least one example embodiment provides a reference signal transmission method that may generate a reference signal using a predetermined sequence and may enhance performance of a user equipment (UE) using the reference signal.

According to an aspect, there is provided a reference signal transmission method performed by at least one base station, the method comprising determining a sequence of a reference signal; performing an inverse Fourier transform (IFT) based on the determined sequence of the reference signal; and transmitting a reference signal generated by performing the IFT through a plurality of continuous symbols. The sequence of the reference signal is determined to satisfy a condition that each of at least one subcarrier signal included in the reference signal waveform continues in a boundary between adjacent two symbols.

According to another aspect, there is provided a method performed by a user equipment (UE), the method comprising receiving a reference signal from at least one base station during a plurality of continuous symbol periods; and acquiring a plurality of snapshot vectors by shifting a fast Fourier transform (FFT) window within the plurality of continuous symbol periods. The reference signal is generated based on a sequence that is determined to satisfy a condition that each of at least one subcarrier signal included in the reference signal waveform continues in a boundary between adjacent two symbols.

According to at least one example embodiment, it is possible to prevent a degradation in analysis performance of a reference signal although an FFT window is deviated from a boundary between symbols.

According to at least one example embodiment, a UE may acquire a sufficient number of snapshot vector data in a plurality of continuous symbol periods.

According to at least one example embodiment, a UE may easily perform a high resolution algorithm by acquiring a sufficient number of snapshot vector data.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

DETAILED DESCRIPTION OF THE INVENTION

Figure 1:
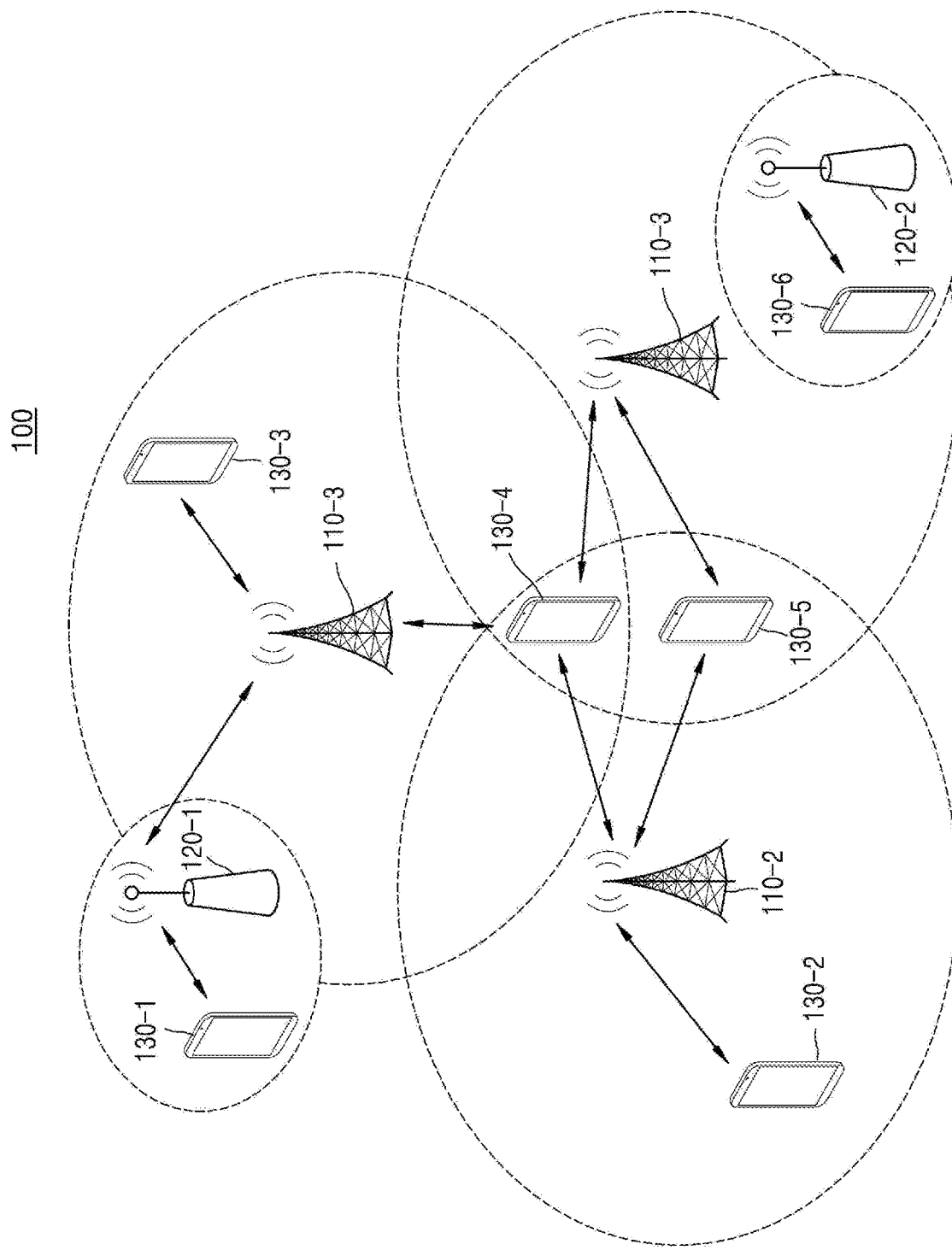
FIG. 1 illustrates an example of a communication system according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first", "second", etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present. In contrast, when a component is referred to as being "directly connected to" or "directly coupled to", there is no intervening component.

The terms used herein are used to simply explain specific example embodiments and are not construed to limit the present disclosure. The singular forms "a", "an", and "the", are intended to include the plural forms as well, unless the context clearly indicates otherwise. It will be further understood that the terms "comprises/comprising," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

FIG. 1 illustrates an example of a communication system according to at least one example embodiment.

Referring to FIG. 1, a communication system 100 may include a plurality of communication nodes, for example, a plurality of base stations 110-1, 110-2, 110-3, 120-1, and 120-2, and a plurality of user equipments (UEs) 130-1, 130-2, 130-3, 130-4, 130-5, and 130-6. Here, the communication system 100 may be referred to as a "communication network". Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier (SC)-FDMA based communication protocol, a non-orthogonal multiple access (NOMA) based communication protocol, a space division multiple access (SDMA) based communication protocol, and the like. Each of the plurality of communication nodes may have the following structure.

The communication system 100 may include the plurality of base stations 110-1, 110-2, 110-3, 120-1, and 120-2, and the plurality of UEs 130-1, 130-2, 130-3, 130-4, 130-5, and 130-6. Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may be included in coverage of the first base station 110-1. The second UE 130-2, the fourth UE 130-4, and the fifth UE 130-5 may be included in coverage of the second base station 110-2. The fifth base station 120-2, the fourth UE 130-4, the fifth UE 130-5, and the sixth UE 130-6 may be included in coverage of the third base station 110-3. The first UE 130-1 may be included in coverage of the fourth base station 120-1. The sixth UE 130-6 may be included in coverage of the fifth base station 120-2.

Here, each of the plurality of base stations 110-1, 110-2, 110-3, 120-1, and 120-2 may be referred to as, for example, NodeB, evolved NodeB, a base transceiver station (BTS), a radio base station, a radio transceiver, an access point, an access node, a road side unit (RSU), a radio remote head (RRH), a transmission point (TP), a transmission and reception point (TRP), a relay node, etc. Each of the plurality of UEs 130-1, 130-2, 130-3, 130-4, 130-5, and 130-6 may be referred to as a terminal, an access terminal, a mobile terminal, a station, a subscriber station, a mobile station, a portable subscriber station, a node, a device, etc.

Each of the plurality of communication nodes 110-1, 110-2, 110-3, 120-1, 120-2, 130-1, 130-2, 130-3, 130-4, 130-5, and 130-6 may support a cellular communication (e.g., long term evolution (LTE), LTE-advanced (LTE-A), 5-th (5G) new radio (NR), etc., specified in a 3rd generation partnership project (3GPP) standard). Each of the plurality of base stations 110-1, 110-2, 110-3, 120-1, and 120-2 may operate in a different frequency band or may operate in the same frequency band. The plurality of base stations 110-1, 110-2, 110-3, 120-1, and 120-2 may be connected to each other through an ideal backhaul or a non-ideal backhaul and may exchange information with each other through the ideal backhaul or the non-ideal backhaul. Each of the plurality of base stations 110-1, 110-2, 110-3, 120-1, and 120-2 may be connected to a core network (not shown) through the ideal backhaul or the non-ideal backhaul. Each of the plurality of base stations 110-1, 110-2, 110-3, 120-1, and 120-2 may transmit a signal received from the core network to a corresponding UE among the UEs 130-1, 130-2, 130-3, 130-4, 130-5, and 130-6, and may transmit a signal received from the corresponding UE among the UEs 130-1, 130-2, 130-3, 130-4, 130-5, and 130-6 to the core network.

Each of the plurality of base stations 110-1, 110-2, 110-3, 120-1, and 120-2 may support an OFDMA based downlink (DL) transmission and may also support an SC-FDMA based uplink (UL) transmission. Further, each of the plurality of base stations 110-1, 110-2, 110-3, 120-1, and 120-2 may support, for example, a multiple input multiple output (MIMO) transmission (e.g., single user (SU)-MIMO, multi user (MU)-MIMO, massive MIMO, etc.), a coordinated multipoint (CoMP) transmission, a carrier aggregation (CA) transmission, a transmission in an unlicensed band, device to device (D2D) communication or proximity services (ProSe), etc. Here, each of the plurality of UEs 130-1, 130-2, 130-3, 130-4, 130-5, and 130-6 may perform an operation corresponding to a corresponding base station among the base stations 110-1, 110-2, 110-3, 120-1, and 120-2 or may perform an operation supported by the corresponding base station among the base stations 110-1, 110-2, 110-3, 120-1, and 120-2.

Figure 2:
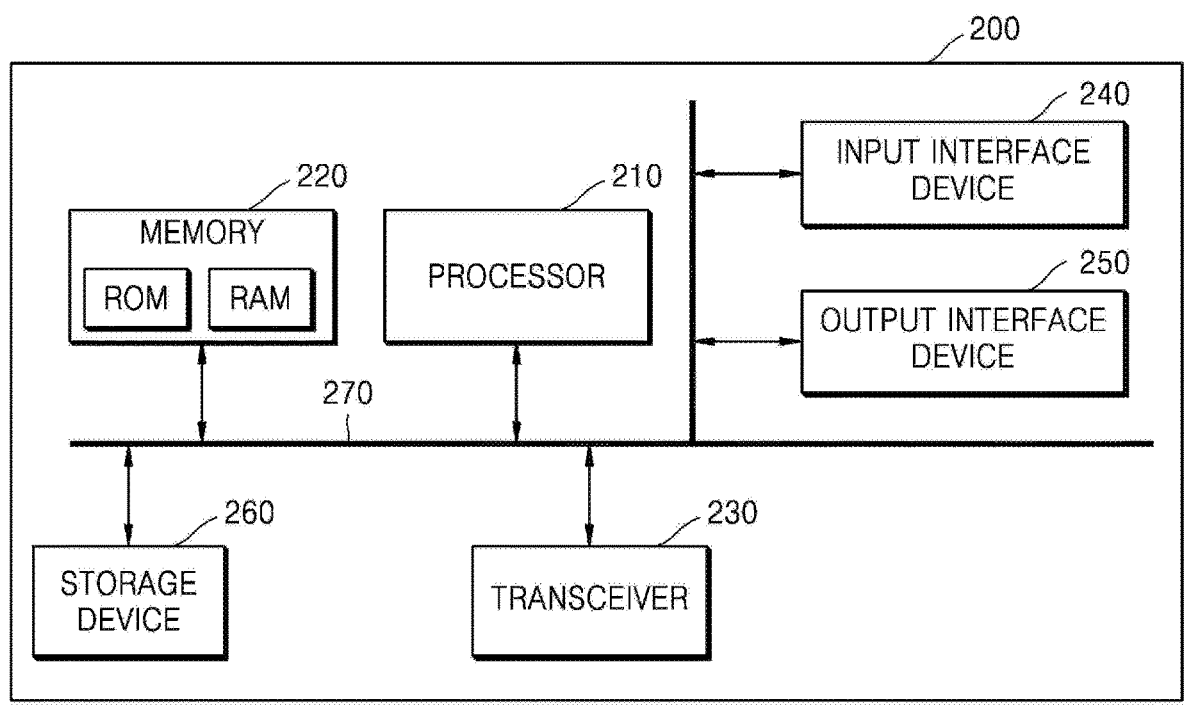
FIG. 2 is a diagram illustrating an example of a configuration of a communication node included in a communication system according to at least one example embodiment.

FIG. 2 is a diagram illustrating an example of a configuration of a communication node included in a communication system according to at least one example embodiment.

Referring to FIG. 2, a communication node 200 may include at least one processor 210, a memory 220, and a transceiver 230 configured to perform communication through connection to a network. Also, the communication node 200 may further include an input interface device 240, an output interface device 250, and a storage device 260. The respective components included in the communication node 200 may connect to a bus 270 and may communicate with each other through the bus 270.

The processor 210 may execute a program command stored in at least one of the memory 220 and the storage device 260. The processor 210 may refer to a central processing unit (CPU), a graphics processing unit (GPU), or an exclusive processor configured to perform methods according to example embodiments. Each of the memory 220 and the storage device 260 may be configured as at least one of volatile storage media and non-volatile storage media. For example, the memory 220 may be configured as at least one of read only memory (ROM) and random access memory (RAM).

In the case of LTE, a sampling rate may be 30.72 MHz and a reciprocal number thereof, 32.552 nanoseconds, may be used as 1 $T_s$ that is a basic time unit. In the case of general positioning, if a single basic time unit is multiplied by a speed of light and is converted to a distance, about an error of 10 m may occur due to sampling resolution. Therefore, it may be difficult to further decrease an error.

Figure 3:
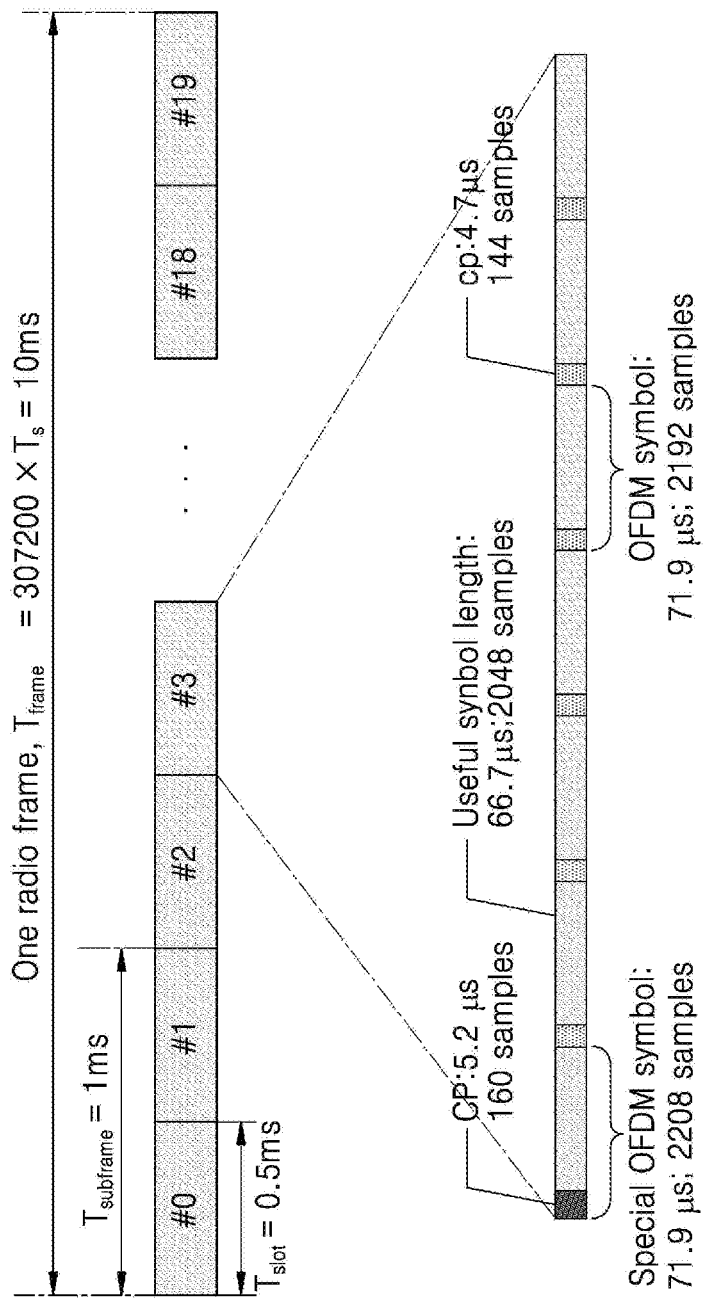
FIG. 3 illustrates an example of a frame structure of long term evolution (LTE) according to at least one example embodiment.

FIG. 3 illustrates an example of a frame structure of LTE according to at least one example embodiment.

Referring to FIG. 3, a radio frame may include 10 subframes and each of the subframes may include 2 slots. Accordingly, the radio frame may include 20 slots, for example, slot #0, slot #1, slot #2, slot #3, . . . slot #18, and slot #19. The radio frame 300 may have a length $T_{frame}$ of 10 ms. A subframe length $T_{subframe}$ may be 1 ms and a slot length $T_{slot}$ may be 0.5 ms.

A slot may include a plurality of OFDM symbols in a time domain and may include a plurality of resource blocks (RBs) in a frequency domain.

A resource block may include a plurality of subcarriers in the frequency domain. A number of OFDM symbols constituting a slot may vary based on a configuration of a cyclic prefix (CP). The CP may be classified into a normal CP and an extended CP. If the normal CP is used, a slot may include 7 OFDM symbols. In this case, a subframe may include 14 OFDM symbols. If the extended CP is used, a slot may include 6 OFDM symbols. In this case, a subframe may include 12 OFDM symbols. In FIG. 3, the normal CP is applied.

If the normal CP is used in an LTE standard, a slot may include 7 OFDM symbols. If the extended CP is used in the LTE standard, a slot may include 6 OFDM symbols. However, it is provided as an example only and the example embodiments are not limited thereto. For example, if the normal CP is used in a 5G NR standard, a slot may be defined to include 14 OFDM symbols. Also, if the extended CP is used in the LTE standard, a slot may include 6 OFDM symbols. However, it is provided as an example only and the example embodiments are not limited thereto. For example, if the extended CP is used in the 5G NR standard, a slot may include 12 OFDM symbols. Herein, the terms "OFDM symbol" and "symbol" may be interchangeably used throughout.

A length of a valid period of a symbol may be determined based on a subcarrier spacing. The length of the valid period of the symbol may correspond to a reciprocal number of the subcarrier spacing. If the subcarrier spacing is 15 kHz, the length of the valid period of the symbol may be a reciprocal number of 15 kHz, i.e., about 66.67 μsec (=2048 $T_s$). A phase of a k-th subcarrier in the valid period of the symbol may be rotated by 2πk.

Each symbol may include a CP that duplicates a portion of a last part of a corresponding symbol and attaches the duplicated portion in a front portion of the symbol. A length of the normal CP may be about 144 $T_s$, which may correspond to 9/128 (=144/2048) of a valid length of a single symbol. A symbol length including CP is about 71.36 μsec. Adding seven symbols does not make up to exactly 0.5 msec. Therefore, 5.21 μsec (=160 may be acquired by further extending only a first symbol of each slot. A CP of a first symbol of a slot may correspond to 10/128 (=160/2048) of the valid length of the symbol. If the normal CP is used, a total sum of accumulated times used for a CP (also, referred to as accumulated CP duration) in 0.5 msec in which a single slot continues may be about 1,024 $T_s$ (=160 $T_s$+144*6 $T_s$), which may correspond to a half of the valid period (=2,048 $T_s$) of a single symbol.

A length of the extended CP is about 512 $T_s$, which may correspond to 1/4 (=512/2048) of the valid length of a single symbol. If the extended CP is used, accumulated CP duration in 0.5 msec in which a single slot continues may be about 3,072 $T_s$ (=512*6 $T_s$), which may correspond to 1.5 times of the valid period (=2,048 $T_s$) of a single symbol An index of a symbol may be numbered for each slot. Therefore, if the normal CP is used, an index of a symbol may use one of 0 to 6. If the extended CP is used, an index of a symbol may use one of 0 to 5. Here, it is assumed that a subcarrier spacing is 15 kHz. In the LTE standard, a length of the normal CP may be represented as the basic time unit $T_s$ according to Equation 1.

$N_{CP,l}$=160 $T_s$ for $l$=0

$N_{CP,l}$=144 $T_s$ for $l$=1,2, . . . 6       [Equation 1]

In Equation 1, $N_{CP,l}$ denotes a length of a CP of an l-th symbol.

Also, in the LTE standard, the length of the extended CP may be determined according to Equation 2.

$N_{CP,l}$=512 $T_s$ for $l$=0,1, . . . 5       [Equation 2]

The 3GPP has published a new radio (NR) subcarrier spacing and a frame standard in a flexible form for 5G mobile communication, starting from Release 15. According to TS38.211 that is a 3GPP standard, even a 5G NR standard may include a CP in a front portion of a symbol of downlink, which is similar to a 4G LTE standard. Also, the 5G NR standard may support various subcarrier spacings, which are not supported in the LTE standard.

Figure 4:
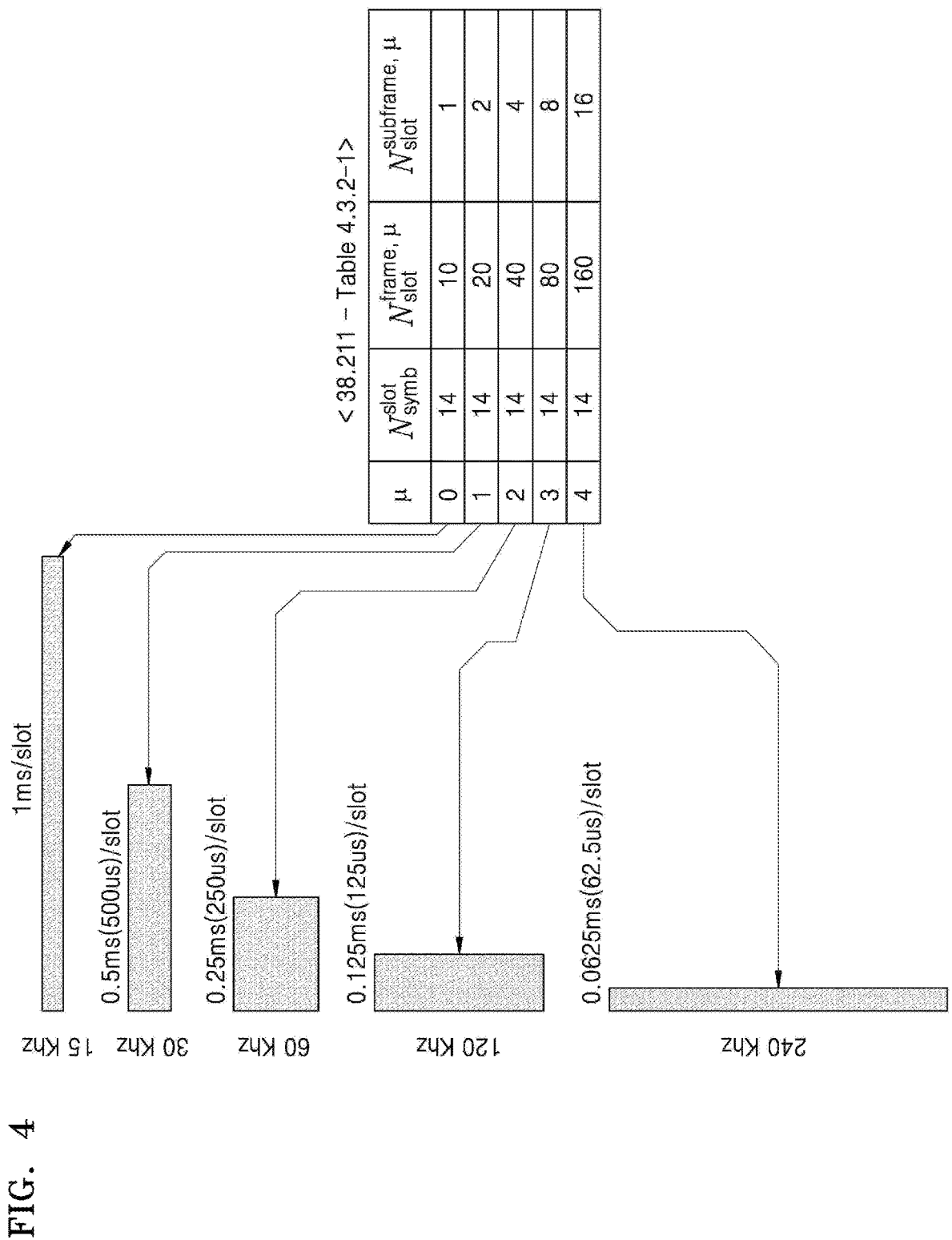
FIG. 4 illustrates an example of a subcarrier spacing supported in a 5-th generation (5G) new radio (NR) standard according to at least one example embodiment.

FIG. 4 illustrates an example of a subcarrier spacing supported in a 5G NR standard according to at least one example embodiment.

Referring to FIG. 4, in the 5G NR standard, a subcarrier spacing may be defined as Δf=15 kHz×$2^μ$. Here, μ=0, 1, 2, 3, 4, 5. That is, the subcarrier spacing may be one of 15 kHz, 30 kHz, 60 kHz, 120 kHz, 240 kHz, and 480 kHz. Here, μ denotes an NR numerology number that determines the subcarrier spacing. A single slot may include 14 OFDM symbols. That is, a single slot may include a total of 14 OFDM symbols regardless of the subcarrier spacing. Here, if the subcarrier spacing is 60 kHz (μ=2), the extended CP may be used. In this case, a single slot may include 12 OFDM symbols.

Since a length of an OFDM symbol varies based on the subcarrier spacing, a length of the slot may vary accordingly. For example, if the subcarrier spacing is Δf=15 kHz×$2^μ$, the length of the slot may be $1/2^μ$ msec.

Figure 5:
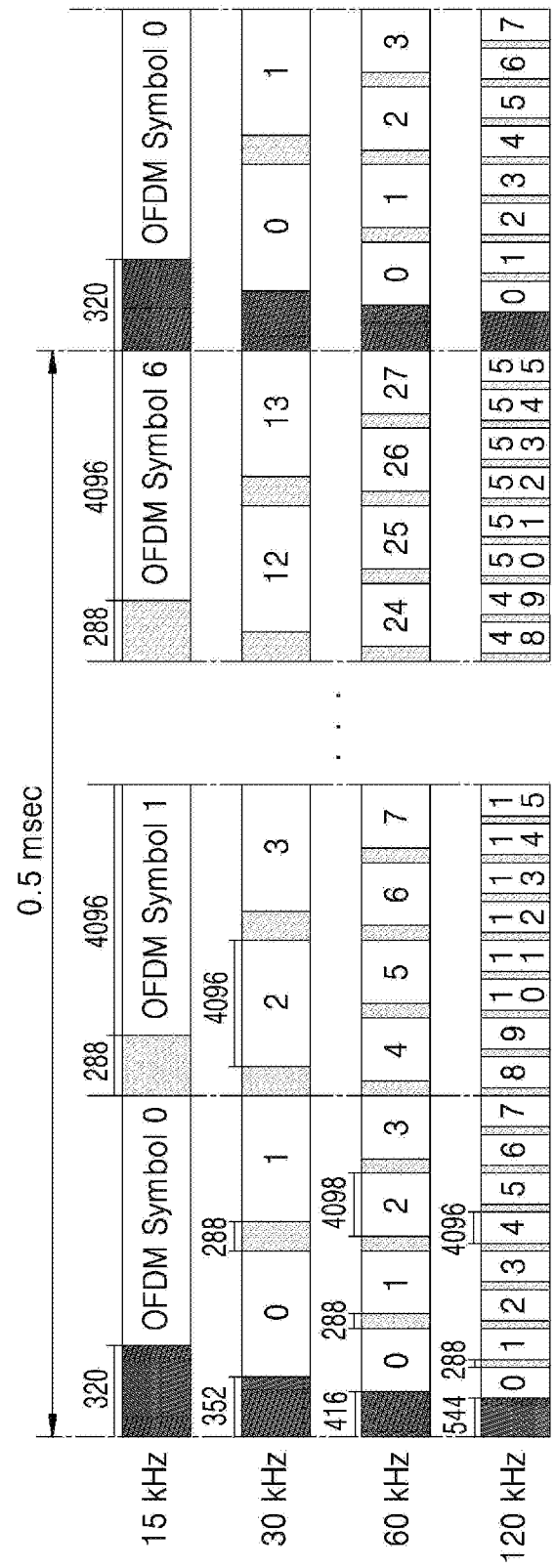
FIG. 5 illustrates an example of a structure of an orthogonal frequency division multiplexing (OFDM) symbol in a 5G NR standard according to at least one example embodiment.

FIG. 5 illustrates an example of a structure of an OFDM symbol in a 5G NR standard according to at least one example embodiment.

Referring to FIG. 5, in the 5G NR standard, (7×$2^μ$) OFDM symbols may be included in 0.5 msec. That is, if a subcarrier spacing is 15 kHz, 7 OFDM symbols may be included in 0.5 msec, if the subcarrier spacing is 30 kHz, 14 OFDM symbols may be included in 0.5 ms, if the subcarrier spacing is 60 kHz, 28 OFDM symbols may be included in 0.5 msec, if the subcarrier spacing is 120 kHz, 56 OFDM symbols may be included in 0.5 msec, if the subcarrier spacing is 240 kHz, 112 OFDM symbols may be included in 0.5 msec, and if the subcarrier spacing is 480 kHz, 224 OFDM symbols may be included in 0.5 msec. Here, if the subcarrier spacing is 60 kHz and the extended CP is used, 24 OFDM symbols may be included in 0.5 msec.

To meet a condition that a sum of lengths of 7×$2^μ$ OFDM symbols is 0.5 msec, a length of a CP included in a first OFDM symbol in 0.5 msec duration may be greater than a length of CP included in a remaining symbol. The total length of CP included in the remaining symbol excluding the first symbol in the 0.5 msec duration may be 144 $T_s$×$2^{-μ}$. Therefore, the accumulated length of CP, including the first CP in the 0.5 msec duration may be 144 $T_s$×$2^{-μ}$+16 $T_s$.

In the 5G NR standard, a length of a valid period of a symbol may be represented as the basic time unit $T_s$ according to Equation 3.

$$N_u^μ = 2048\ T_s \cdot 2^{-μ}$$       [Equation 3]

In Equation 3, μ denotes a parameter (i.e. NR numerology number) that determines the subcarrier spacing and $N_u^μ$ denotes the length of the valid period of the symbol that is represented as the basic time unit.

In the 5G NR standard, the CP length may be represented as the basic time unit $T_s$ according to Equation 4.

$$N_{CP,\ell}^μ = \begin{cases} 512\,T_s \cdot 2^{-μ} & \text{extended cyclic prefix} \\ 144\,T_s \cdot 2^{-μ} + 16 & \ell = 0 \text{ or } \ell = 7 \cdot 2^μ \\ 144\,T_s \cdot 2^{-μ} & \ell \neq 0 \text{ and } \ell \neq 7 \cdot 2^μ \end{cases}$$ [Equation 4]

In Equation 4, for simplicity, it is assumed that an index of a symbol is numbered for each subframe. In this case, in a single subframe, a symbol with an index of l=0 and a symbol with an index of l=7·$2^μ$ may correspond to the first symbols in 0.5 ms duration. In contrast, an index of a remaining symbol excluding the first symbol in the 0.5 ms duration may satisfy l≠0 and l≠7·$2^μ$. In each case, the CP length may be determined according to Equation 4.

Table 1 shows a change in numerology according to a subcarrier spacing.

TABLE 1

| | Scalable OFDM numerology for 5G NR (3GPP Release 15) | | | | | | | |
|---|---|---|---|---|---|---|---|---|
| Subcarrier spacing | 15 kHz | | 30 kHz | | 60 kHz | | 120 kHz | |
| Time unit | μsec | $T_s$ | μsec | $T_s$ | μsec | $T_s$ | μsec | $T_s$ |
| Valid period of OFDM symbol | 66.67 | 2048 | 33.33 | 1024 | 16.67 | 512 | 8.33 | 256 |
| 1st CP duration | 5.21 | 160 | 2.864 | 88 | 1.692 | 52 | 1.107 | 34 |
| Normal CP duration | 4.69 | 144 | 2.34 | 72 | 1.17 | 36 | 0.59 | 18 |
| # of symbols in 0.5 msec duration | 7 | | 14 | | 28 | | 56 | |
| Normal CP ratio to valid period of OFDM symbol | 9/128 | | 9/128 | | 9/128 | | 9/128 | |
| Accumulated CP duration in 0.5 msec | 33.33 | 1024 | 33.33 | 1024 | 33.33 | 1024 | 33.33 | 1024 |
| Accumulated CP ratio to valid period of OFDM symbol in 0.5 msec | 1/2 (=1024/2048) | | 1 (=1024/1024) | | 2 (=1024/512) | | 4 (=1024/256) | |

Referring to Table 1, the CP length may vary according to a change in a subcarrier spacing. A ratio of accumulated normal CP duration to a valid period of a symbol in 0.5 msec may vary. A ratio of a remaining CP excluding the first CP to the valid period of the symbol in 0.5 msec may be maintained at 9/128. If the subcarrier spacing is $\Delta f=15$ kHz$\times 2^\mu$, a ratio of the accumulated normal CP duration to the valid period of the symbol may be $2^{\mu-1}$. For example, if the subcarrier spacing is 15 kHz, the accumulated CP duration in 0.5 msec may be 1/2 of the valid period of the symbol.

In the 5G NR standard, the extended CP is applied only when the subcarrier spacing is 60 kHz. A length of the extended CP is about 128 $T_s$, which may correspond to 1/4 (=128/512) of a valid length of a single symbol. If the extended CP is used, 24 symbols may be included in 0.5 ms in which a single slot continues and accumulated CP duration may be about 3,072 $T_s$ (=24*128 $T_s$), which may correspond to six times of the valid period (=512 $T_s$) of the symbol. Table 2 shows a comparison of numerology associated with the extended CP in each of the LTE standard and the 5G NR standard.

TABLE 2

| | Comparison of 4G/5G Extended CP Length | | | |
|---|---|---|---|---|
| Subcarrier spacing | 15kHz (LTE) | | 60 kHz (5G) | |
| Time unit | μsec | Ts | μsec | Ts |
| Valid period of OFDM symbol | 66.67 | 2048 | 16.67 | 512 |
| Extended CP duration | 16.67 | 512 | 4.17 | 128 |
| # of symbols in 0.5 msec duration | 6 | | 24 | |
| Extended CP ratio to valid period of OFDM symbol | 1/4 | | 1/4 | |
| Accumulated CP duration in 0.5 msec | 100 | 3072 | 100 | 3072 |
| Accumulated CP ratio to valid period of OFDM symbol in 0.5 msec | 1.5 | | 6 | |

According to an OTDoA scheme defined in the LTE standard, a UE may estimate a position of the UE by measuring a difference in time of arrival (ToA) between positioning reference signals (PRSs) transmitted from different base stations. Here, since a symbol timing is synchronized only in a serving base station (serving eNB) to which the UE belongs, the UE may collect sample data corresponding to a fast Fourier transform (FFT) window and may perform a time estimation without awareness of an accurate point at which a symbol starts in a PRS of a neighboring base station.

Figure 6:
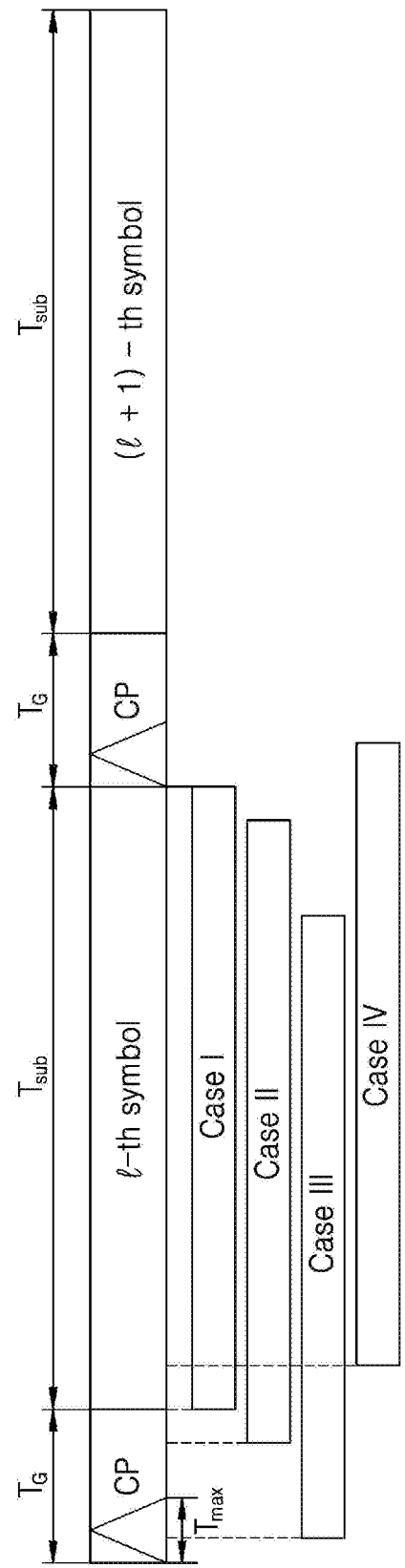
FIG. 6 illustrates an example of an alignment relationship between a symbol and a fast Fourier transform (FFT) window according to at least one example embodiment.

FIG. 6 illustrates an example of an alignment relationship between a symbol and an FFT window according to at least one example embodiment.

Referring to FIG. 6, in Case I, the FFT window and a valid period of the symbol may not match. Accordingly, a UE may analyze a reference signal by performing an FFT in the valid period of the symbol. In this case, orthogonality between subcarriers may be guaranteed during an FFT performing process and the UE may acquire relatively excellent quality information. For example, the UE may acquire information about a latency between a base station and the UE. As another example, the UE may acquire information about a phase of a reference signal. If the UE receives signals from a plurality of base stations, the UE may acquire information about a phase difference between reference signals transmitted from the plurality of base stations. The UE may acquire information about a difference in time of arrival (ToA) between reference signals transmitted from the plurality of base stations. The aforementioned information is provided as an example only and the example embodiments are not limited thereto.

In Case II and Case III, the FFT window and the valid period of the symbol may not match. However, the FFT window may be present within a single symbol. Also, in a CP duration, a portion of the valid period of the symbol may be duplicated. Therefore, in this case, the UE may relatively excellently acquire information from a reference signal. However, in Case IV, the FFT window may be positioned across two symbols. In this case, a reference signal may be discontinuous in a boundary between symbols. Accordingly, the UE may acquire limited information from the reference signal. Also, orthogonality between subcarrier signals included in the reference signal may not be guaranteed, which may lead to degrading a signal analysis performance.

In the case of applying the following high resolution analysis algorithm, a large number of pieces of sample data (e.g. snapshot vectors) may be required. Here, due to the aforementioned constraint condition that the FFT window needs to be positioned in a single symbol, a number of snapshot vectors acquirable by the UE may be limited. However, according to the present disclosure, since a signal waveform continues regardless of a boundary between symbols, the UE may perform an FFT by shifting the FFT window based on a sampling rate in a time domain or an integer multiple unit of the sampling interval, or may acquire a number of snapshot vectors corresponding to the plurality of pieces of sample data over a plurality of symbol periods. Accordingly, the degree of an error variation may decrease by the acquired number of snapshot vectors in a given pieces of sample data.

In OFDM, the respective subcarrier components may be orthogonal to each other and a signal may be represented as a sum of N complex sine waves. Therefore, a random signal may be represented as Equation 5.

$$x_f[n] = \sum_{k=0}^{N-1} X_f[k] e^{j2\pi k n/N}, \; n = 0, 1, 2, 3, \ldots N-1 \quad \text{[Equation 5]}$$

In Equation 5, N denotes a total number of subcarriers and $X_f[k]$ denotes a frequency domain complex number representing an initial phase and amplitude of a k-th subcarrier of an f-th symbol.

Figure 7:
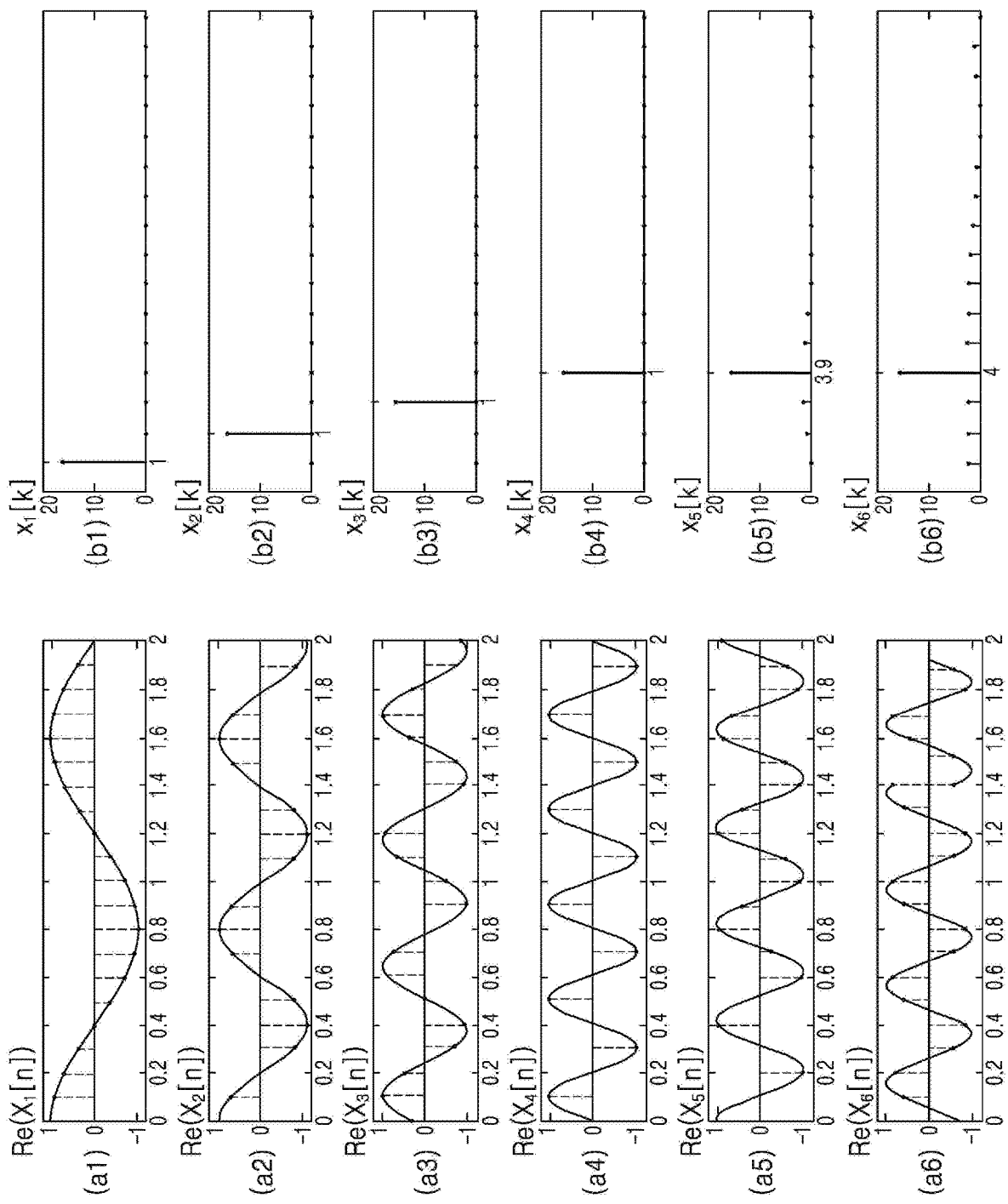
FIG. 7 illustrates an example of a change in a signal based on a complex number $X_l[k]$ value according to at least one example embodiment.

FIG. 7 illustrates an example of a change in a signal based on a complex number $X_f[k]$ value according to at least one example embodiment.

Referring to FIG. 7, a frequency domain component of a signal may vary according to the complex number $X_f[k]$. FIG. 7 illustrates an example in which a signal includes a single frequency component. However, when the complex number $X_f[k]$ is not zero with respect to a plurality of k values, a signal may include a plurality of frequency components.

Figure 8:
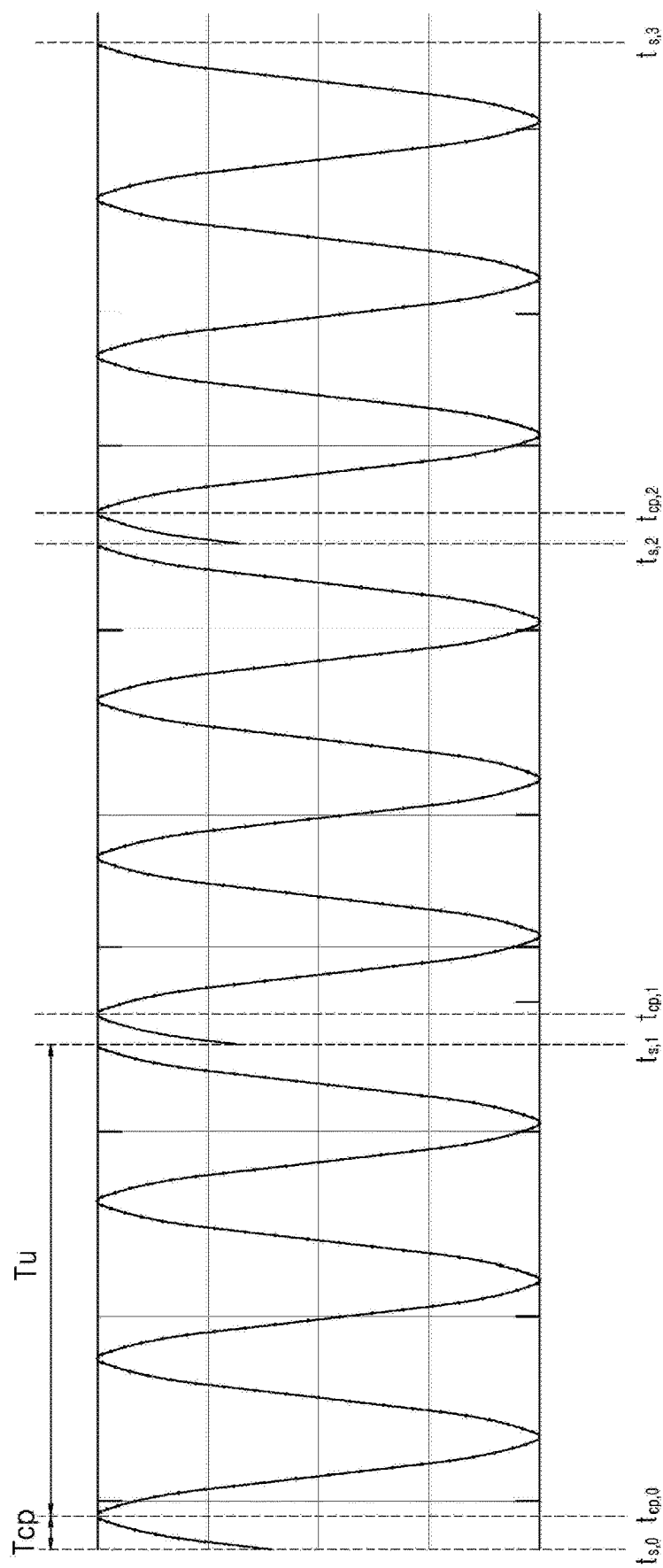
FIG. 8 illustrates an example of a subcarrier discontinuous in a boundary between OFDM symbols according to at least one example embodiment.

FIG. 8 illustrates an example of a subcarrier waveform discontinuous in a boundary between OFDM symbols according to at least one example embodiment. As an example, FIG. 8 illustrates a subcarrier corresponding to k=3.

Referring to FIG. 8, $t_{s,0}$, $t_{s,1}$, $t_{s,2}$, and $t_{s,3}$ denote a start point of a zero-th symbol, a start point of a first symbol, a start point of a second symbol, and a start point of a third symbol, respectively. Also, $t_{cp,0}$ denotes an end point of a CP duration of the zero-th symbol and also a start point of a valid period of the zero-th symbol. Likewise, $t_{cp,1}$ and $t_{cp,2}$ denote an end point of a CP duration of the first symbol and an end point of a CP duration of the second symbol, respectively. $T_u$ denotes a length of a valid period of a symbol and $T_{CP}$ denotes a length of a CP duration of the symbol.

During the valid period of the symbol ($T_u$), a phase of a sine wave may rotate by integer multiple of $2\pi$ (e.g., if k=3, $2\pi \times 3 = 6\pi$). Accordingly, a signal phase $\varphi p_0$ at $t_{cp,0}$ that is the start point of the valid period of the zero-th symbol may be equal to a signal phase at $t_{s,1}^-$ that is the end point of the zero-th symbol. Here, $t_{s,1}^-$ may indicate a left limit of $t_{s,1}$ and $t_{s,1}^+$ may indicate a right limit of $t_{s,1}$. Referring to FIG. 8, a signal phase at $t_{s,1}^-$ may differ from a signal phase at $t_{s,1}^+$. While the signal phase may be $\varphi_0$ at $t_{s,1}^-$, the signal phase may be $$\varphi_0 - 2\pi k \cdot \frac{T_{CP}}{T_u} \text{ at } t_{s,1}^+.$$

That is, the signal may discontinuous at $t_{s,1}$.

If a normal CP is applied in a 4G or 5G system, the ratio of $T_{cp}/T_u = 9/128$. Also, if an extended CP is applied in the 4G or 5G system, the ratio of $T_{cp}/T_u = 1/4$.

As described above, if a sine wave included in a reference signal is discontinuous in a boundary between adjacent symbols, orthogonality of the sine wave may not be guaranteed. Also, a limit condition may apply when a UE changes an FFT window. In addition, if the FFT window of the UE is not positioned within a single symbol, performance may be degraded.

Figure 9:
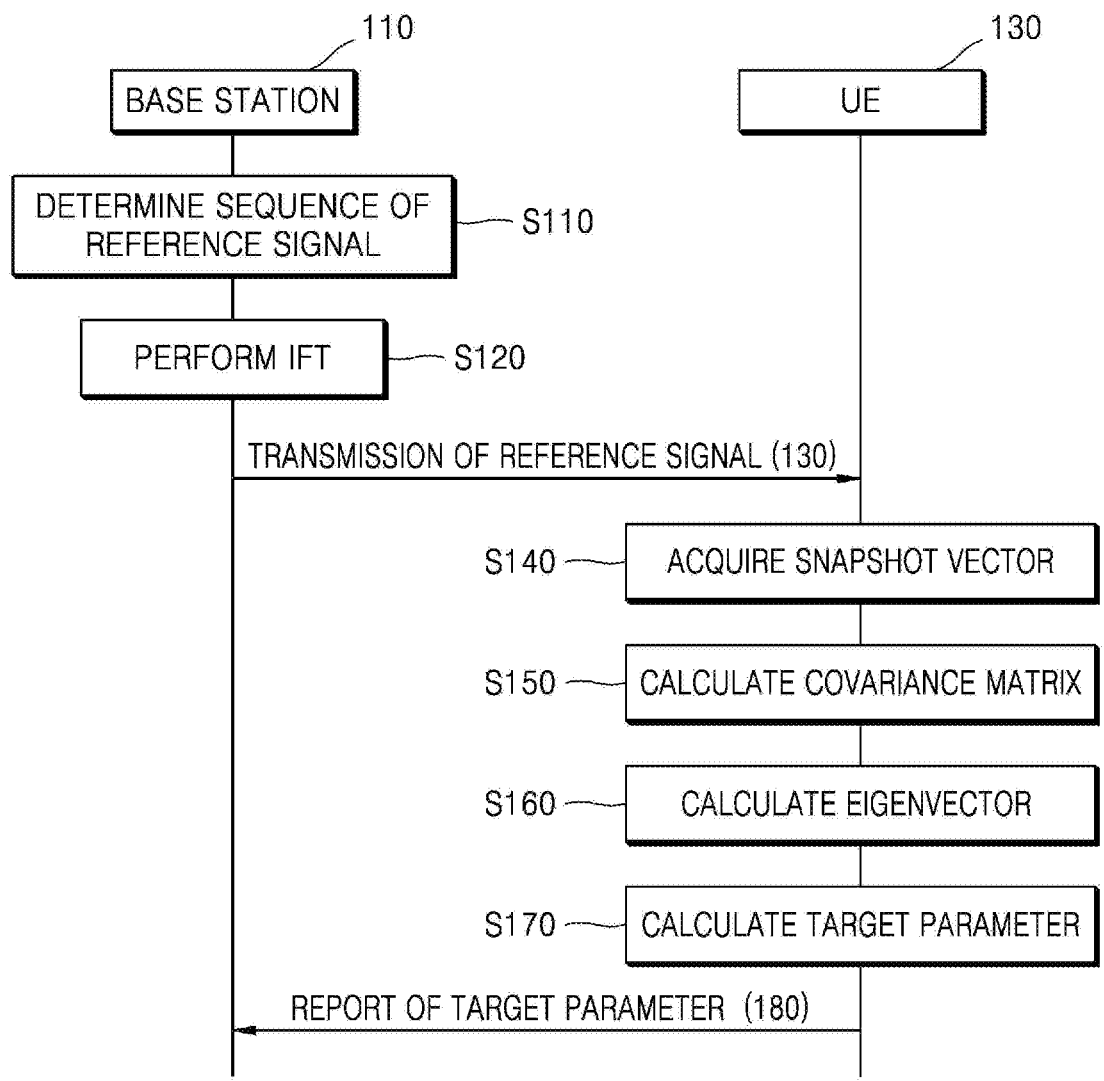
FIG. 9 is a flowchart illustrating an example of a reference signal transmission method according to at least one example embodiment.

FIG. 9 is a flowchart illustrating an example of a reference signal transmission method according to at least one example embodiment. Although FIG. 9 illustrates an example in which a single base station 110 transmits a reference signal to a UE 130, it is provided as an example only. A plurality of base stations 110 may transmit a reference signal to the UE 130.

Referring to FIG. 9, in operation S110, the base station 110 may determine a sequence of a reference signal. The reference signal may include at least one subcarrier signal. The reference signal may be a positioning reference signal (PRS) used to estimate a position of the UE 130. The UE 130 may measure a phase of the reference signal or may measure a latency of reference signal transmission.

The base station 110 may determine the sequence of the reference signal such that each subcarrier signal included in the reference signal continues in a boundary between adjacent symbols. Here, the sequence may correspond to the frequency domain complex number $X_f[k]$ of Equation 5.

Referring again to FIG. 8, the base station 110 may change a signal phase at $t_{cp,1}$ to differ from a signal phase at $t_{cp,0}$ such that a signal phase at $t_{s,1}^-$ may be equal to a signal phase at $t_{s,1}^+$. For example, if the signal phase at $t_{cp,1}$ is set to $$\varphi_0 + 2\pi k \cdot \frac{T_{CP}}{T_u},$$

the signal phase at $t_{s,1}^-$ may become equal to the signal phase at $t_{s,1}^+$. That is, the signal may continue at $t_{s,1}$. Generally describing, the base station 110 may set a sequence of a reference signal such that a phase of a sequence of an n-th symbol may be rotated by a phase corresponding to a CP duration of an (n−1)-th symbol compared to a phase of a sequence of the (n−1)-th symbol. Here, n denotes a natural number. In an LTE standard, n=1, 2, . . . 6. In a 5G NR standard, n denotes a random natural number.

For example, the base station 110 may determine the sequence of the reference signal to satisfy Equation 6.

$$X_f[k] = X_{f-1}[k] \cdot \exp\left(2\pi j k \cdot \frac{T_{CP,f-1}}{T_u}\right) \quad \text{[Equation 6]}$$

In Equation 6, $X_f[k]$ denotes a frequency domain complex number representing an initial phase and amplitude of a k-th subcarrier of an l-th symbol, $T_u$ denotes a length of a valid period of a symbol, and $T_{CP,l-1}$ denotes a length of a CP duration of an (l−1)-th symbol. Here, l denotes a natural number. In the LTE standard, an index of a symbol may be counted for each slot. If a normal CP is used in the LTE standard, l=1, 2, . . . 6. If an extended CP is used in the LTE standard, l=1, 2, . . . 5. In the 5G NR standard, an index of a symbol may continuously increase in a time domain.

Referring to Equation 6, in a sequence of a reference signal, a sequence value corresponding to the l-th symbol may correspond to a value that is phase-shifted by $2\pi k \cdot$ from a sequence value corresponding to the (l−1)-th symbol. Differently representing, Equation 6 may be expressed as Equation 7.

$$X_\ell[k] = X_0[k] \cdot \exp\left(2\pi jk \cdot \sum_{i=1}^{\ell} \frac{T_{CP,i-1}}{T_u}\right) \quad \text{[Equation 7]}$$

In Equation 7, $X_0[k]$ denotes a frequency domain complex number representing an initial phase and amplitude of a k-th subcarrier of an initial symbol (symbol index=0).

Referring to Table 1, if the normal CP is applied, the ratio of CP length to a valid length of symbol excluding a first symbol in 0.5 msec duration may be constant (=9/128). If the extended CP is applied, the ratio of CP length to a valid length of symbol may be constant (=1/4). They may apply not only to the LTE standard but also to the 5G NR standard. Further, referring to Table 1, a length of accumulated CP duration to a length of a valid period of a symbol in 0.5 msec is 1/2. That is, a phase rotation corresponding to the accumulated CP in 0.5 msec may be $$\frac{1}{2} \times 2\pi k = \pi k.$$

The phase rotation $\pi k$ may correspond to a multiplication of $(-1)^k$. That is, in the LTE standard, if k is an odd number, a reference signal sequence component of a first symbol of an (s+1)-th slot and a reference signal sequence component of a first symbol of an s-th slot may have different signs. In contrast, in the LTE standard, if k is an even number, the reference signal sequence component of the first symbol of the (s+1)-th slot may be equal to the reference signal sequence component of the first symbol of the s-th slot.

In the LTE standard, a sequence component of a symbol not present at a start point of a slot may be phase-rotated from a sequence component of a previous symbol by $$2\pi k \times \frac{9}{128}.$$

If the normal CP is applied in the LTE standard, a sequence of a reference signal may be represented as Equation 8.

$$X_{s,\ell}[k] = (-1)^{s \cdot k} \varphi_{init}^k \cdot \exp\left(2\pi jk \cdot \ell \cdot \frac{T_{cp}}{T_u}\right) \quad \text{[Equation 8]}$$

In Equation 8, $\varphi_{init}^k$ denotes a frequency domain complex number representing an initial phase and amplitude of a k-th subcarrier of an initial symbol of an initial slot. Also, s denotes a slot index, l denotes a symbol index, and $X_{s,l}[k]$ denotes a frequency domain complex number representing an initial phase and amplitude of a k-th subcarrier of an l-th symbol of an s-th slot. If k is an even number, $(-1)^{s \cdot k}$ is 1 at all times. Therefore, an initial phase of a k-th subcarrier of a start symbol of a slot may be the same regardless of a slot index. In contrast, if k is an odd number, $(-1)^{s \cdot k}$ is −1 for s=odd number and 1 for s=even number. Therefore, the initial phase of the k-th subcarrier of the start symbol of the slot may be inversed based on a slot index. If the symbol index l is numbered for each slot, l may be one of 0, 1, 2, . . . 6. Accordingly, $$P = \ell \text{ and } \frac{T_{cp}}{T_u} = 9/128.$$

If the normal CP is applied in the 5G NR standard, the sequence of the reference signal may be represented as Equation 9.

$$X_{s,\ell}[k] = (-1)^{s \cdot k \cdot \delta(\mu)} \varphi_{init}^k \cdot \exp\left(2\pi jk \cdot P \cdot \frac{T_{cp}}{T_u}\right), \quad \text{[Equation 9]}$$

$$P = \ell \bmod (7 \cdot 2^\mu), \mu = 0, 1, 2, 3..$$

In Equation 9, $\varphi_{init}^k$ denotes a frequency domain complex number representing an initial phase and amplitude of a k-th subcarrier of an initial symbol of an initial slot, and $X_{s,l}[k]$ denotes a frequency domain complex number representing an initial phase and amplitude of a k-th subcarrier of an l-th symbol of an s-th slot. Also, mod denotes a modulo function used to acquire a remainder. In the case of the normal CP of the LTE standard, numerology number μ=0 and accordingly, P and l=0, . . . 6. Also, δ(μ) is a Dirac delta function that is defined as 1 only if μ=0. An index portion equation of −1 that determines a sign of a subcarrier, i.e., s·k·δ(μ), is defined if μ=0, that is, if subcarrier spacing is 15 kHz. The index portion of −1 is 0 in other subcarrier spacings, that is, if μ>0. Therefore, start symbols of all of the subcarriers have a positive sign. If μ=0 and s*k=odd number, s·k·δ(μ) that is the index portion equation of −1 becomes an odd number and a start sign of a subcarrier becomes −1. That is, in the LTE standard or the 5G NR standard to which the subcarrier spacing of 15 kHz is applied, if k is an odd numbered subcarrier, a first symbol sign of each slot is +1 for slot number=even number and −1 for slot number=odd number. If the normal CP is applied.

$$\frac{T_{cp}}{T_u} = 9/128.$$

In the 5G NR standard, if the symbol index is numbered based on a subframe unit and, in this instance, if subcarrier spacing=15 kHz, a sequence of a reference signal may be represented as Equation 10.

$$X_\ell[k] = (-1)^{s \cdot k} \varphi_{init}^k \cdot \exp\left(j\frac{9}{64}kP\pi\right) \quad \text{[Equation 10]}$$

$$s = \left[\frac{\ell}{7}\right], P = \ell \bmod 7$$

In Equation 10, $\varphi_{init}^k$ denotes a frequency domain complex number representing an initial phase and amplitude of a k-th subcarrier of an initial symbol of an initial slot, and $X_l[k]$ denotes a frequency domain complex number representing an initial phase and amplitude of a k-th subcarrier of an l-th symbol. s denotes a maximum integer less than or equal to l/7. Here, the parameter s is redefined since a length of a slot is not 0.5 msec if subcarrier spacing=15 kHz in the 5G NR standard. Here, P denotes a remainder acquired by dividing l by 7. For example, if l=10, s=1 and P=3.

In the 5G NR standard, if the subcarrier spacing is 15 kHz or higher (e.g., 30 kHz, 60 kHz, 120 kHz, 240 kHz), there is no need to change a sign of a sequence component based on a unit of 0.5 msec. Also, referring again to Equation 4, a length of a start symbol (l=0 or l=7·2$^\mu$) in 0.5 msec duration may differ from lengths of other symbols (l≠0 and l=7·2$^\mu$). With the assumption that the normal CP is applied, if the subcarrier spacing is 15 kHz or higher in the 5G NR standard, a sequence of a reference signal may be represented as Equation 11.

$$\begin{cases} X_\ell[k] = \varphi_{init}^k & \ell = 0 \text{ or } \ell = 7 \cdot 2^\mu \\ X_\ell[k] = \varphi_{init}^k \cdot \exp\left(j\frac{9}{64}k\ell\pi\right) & \ell \neq 0 \text{ and } \ell \neq 7 \cdot 2^\mu \end{cases} \quad \text{[Equation 11]}$$

In Equation 11, μ denotes a parameter that determines a subcarrier spacing, $\varphi_{init}^k$ denotes a frequency domain complex number representing an initial phase and amplitude of a k-th subcarrier of an initial symbol of an initial slot, and X$_l$[k] denotes a frequency domain complex number representing an initial phase and amplitude of a k-th subcarrier of an l-th symbol. Although numerology of the normal CP is applied in Equation 11, it is provided as an example only and the example embodiments are not limited thereto.

If the extended CP is applied in the LTE standard and the 5G NR standard, a sequence of a reference signal may be represented as Equation 12.

$$X_{s,\ell}[k] = (-1)^{s \cdot k} \varphi_{init}^k \cdot \exp\left(2\pi jk \cdot \ell \cdot \frac{T_{cp}}{T_u}\right), \text{ in } LTE \quad \text{[Equation 12]}$$

$$X_{s,\ell}[k] = \varphi_{init}^k \cdot \exp\left(2\pi jk \cdot \ell \cdot \frac{T_{cp}}{T_u}\right) \text{ in } 5GNR$$

In Equation 12, in the LTE standard, l denotes a symbol index and may be 0 . . . 5. Also, in the 5G NR standard, l denotes the symbol index and may be 0 . . . 11. Also, $\varphi_{init}^k$ denotes a frequency domain complex number representing an initial symbol of an initial slot, an initial phase and amplitude of a k-th subcarrier, and X$_{s,l}$[k] denotes a frequency domain complex number representing an initial phase and amplitude of a k-th subcarrier of an l-th symbol of an s-th slot. If k is an odd numbered subcarrier, a first symbol sign of each slot is +1 for slot number=even number and −1 for slot number=odd number. If k is an even numbered subcarrier, all of start number signs of each slot is +1. In the 5G NR standard, a single slot may include 12 symbols and accumulated CP duration in the slot may be three times (1/4*12=3) of a valid period of a symbol. Accordingly, since a phase rotation by the accumulated extended CP duration in a slot is 6πk, initial phases of k-th subcarriers in start symbols of different slots may be equal to each other. In the extended CP, T$_{cp}$/T$_u$=1/4.

If the symbol index is numbered for each subframe and the extended CP is applied, a sequence of a reference signal may be represented as Equation 13.

$$X_\ell[k] = (-1)^{s \cdot k} \varphi_{init}^k \cdot \exp\left(2\pi jk \cdot P \cdot \frac{T_{cp}}{T_u}\right), \quad \text{[Equation 13]}$$

$$s = \left[\frac{\ell}{6}\right], P = \ell \bmod 6 \text{ in } LTE$$

$$X_\ell[k] = \varphi_{init}^k \cdot \exp\left(2\pi jk \cdot P \cdot \frac{T_{cp}}{T_u}\right),$$

$$P = \ell \bmod 24 \text{ in } 5GNR$$

In Equation 13, ℓ denotes a symbol index number and may be 0 . . . 5. $\varphi_{init}^k$ denotes a frequency domain complex number representing an initial phase and amplitude of a k-th subcarrier of an initial symbol of an initial slot, and X$_l$[k] denotes a frequency domain complex number representing an initial phase and amplitude of a k-th subcarrier of an l-th symbol. If 60 kHz subcarrier spacing is applied, P may be 0 . . . 23 in a symbol of the extended CP and T$_{cp}$/T$_u$=1/4.

Referring again to FIG. 9, in operation S120, the base station 110 may perform an inverse Fourier transform (IFT) based on the sequence of the reference signal that is determined according to one of Equation 6 to Equation 10. Here, the IFT may be interpreted as including inverse fast Fourier transform (IFFT) or inverse discrete Fourier transform (IDFT). In operation S130, the base station 110 may transmit the reference signal that is generated by performing the IFT. The UE 130 may receive the reference signal from the base station 110. The base station 110 may transmit the reference signal through a plurality of continuous symbols. The reference signal generated by the base station 110 may be continuous in a boundary between adjacent symbols.

Figure 10:
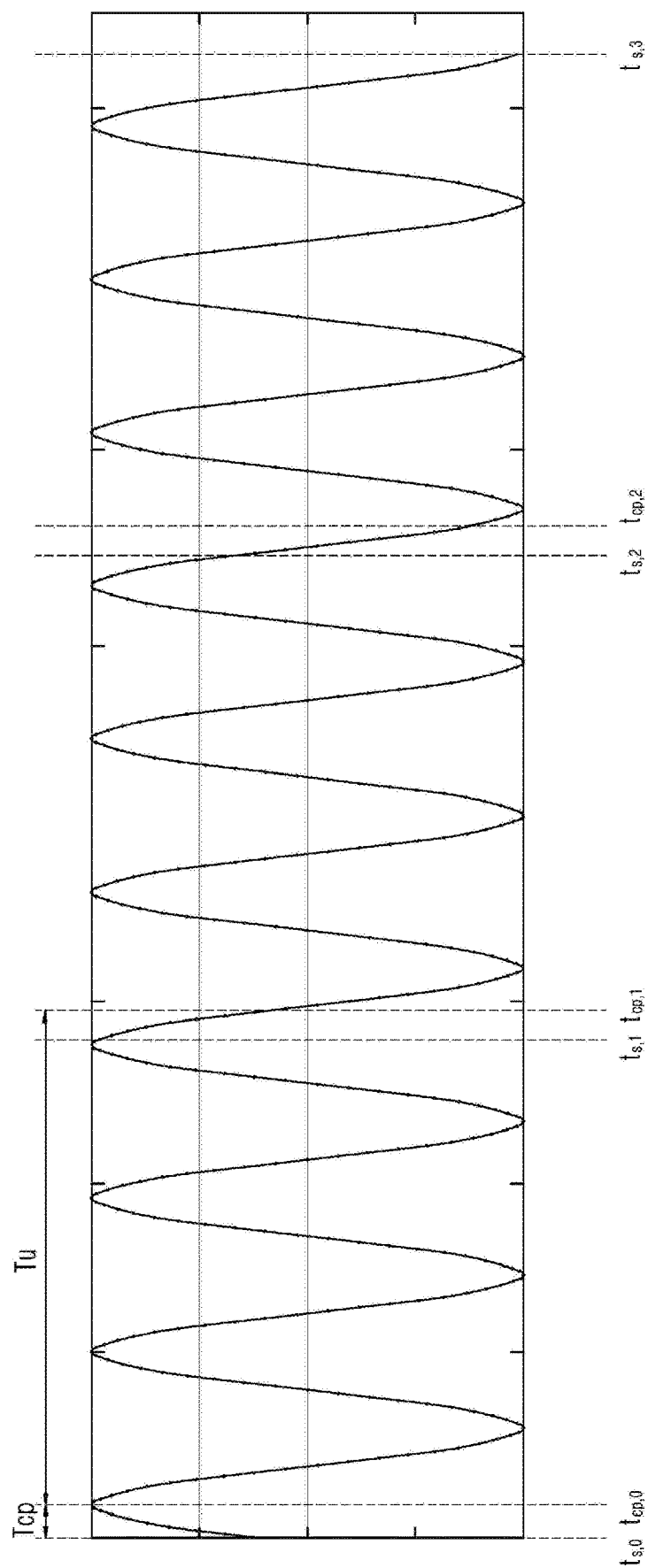
FIG. 10 illustrates an example of a reference signal generated by a base station according to at least one example embodiment.

FIG. 10 illustrates an example of a reference signal generated by the base station 110.

Referring to FIG. 10, the base station 110 may generate a reference signal based on the sequence of the reference signal that is determined according to one of Equation 6 to Equation 10. Accordingly, a subcarrier waveform of the reference signal of FIG. 10 may be continuous in a boundary between adjacent symbols, which differs from the example of FIG. 8. If the UE 130 performs an FFT, there may be no need to include an FFT window according to symbol boundary. That is, the UE 130 may acquire sufficient sample data by moving, that is, shifting the FFT window in a continuation of waveform. Also, it is possible to avoid degradation in performance occurring when the FFT window deviates from the exact boundary between symbols.

The base station 110 may transmit the reference signal using a plurality of subcarriers.

Figure 11:
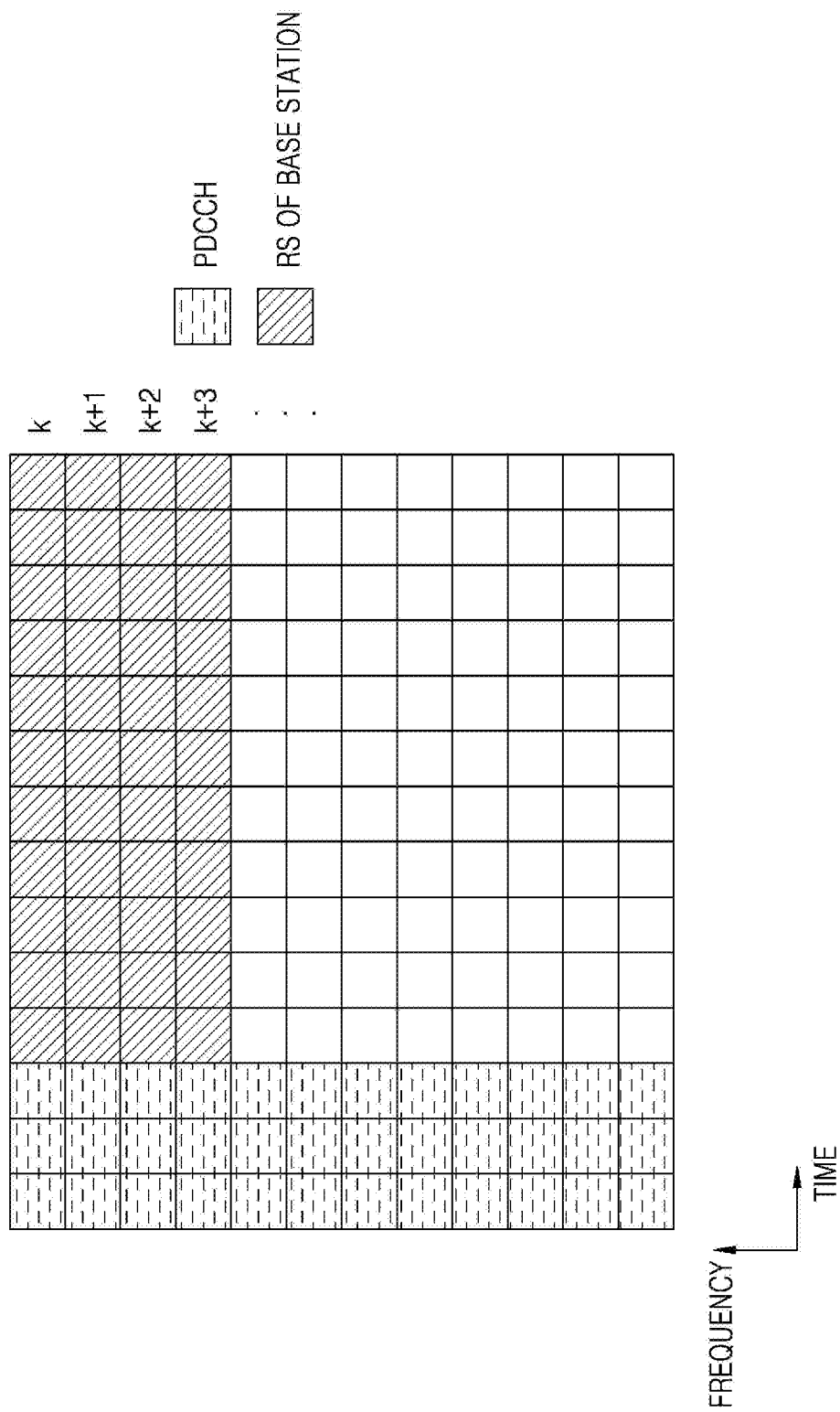
FIG. 11 illustrates a first example of a resource configuration of a reference signal transmitted from a base station according to at least one example embodiment.

FIG. 11 illustrates a first example of a resource configuration of a reference signal transmitted from the base station 110 according to at least one example embodiment.

Referring to FIG. 11, the base station 110 may transmit a reference signal including a plurality of continuous subcarriers using a plurality of continuous symbols. If the reference signal includes the plurality of subcarriers, a matrix representing a channel through which subcarrier signals pass may be represented as Vandermonde matrix. Accordingly, a calculation may be easily performed by applying a super resolution algorithm, such as, for example, a multiple signal classification (MUSIC) algorithm, a MinNorm algorithm, and an ESPRIT algorithm.

Figure 12:
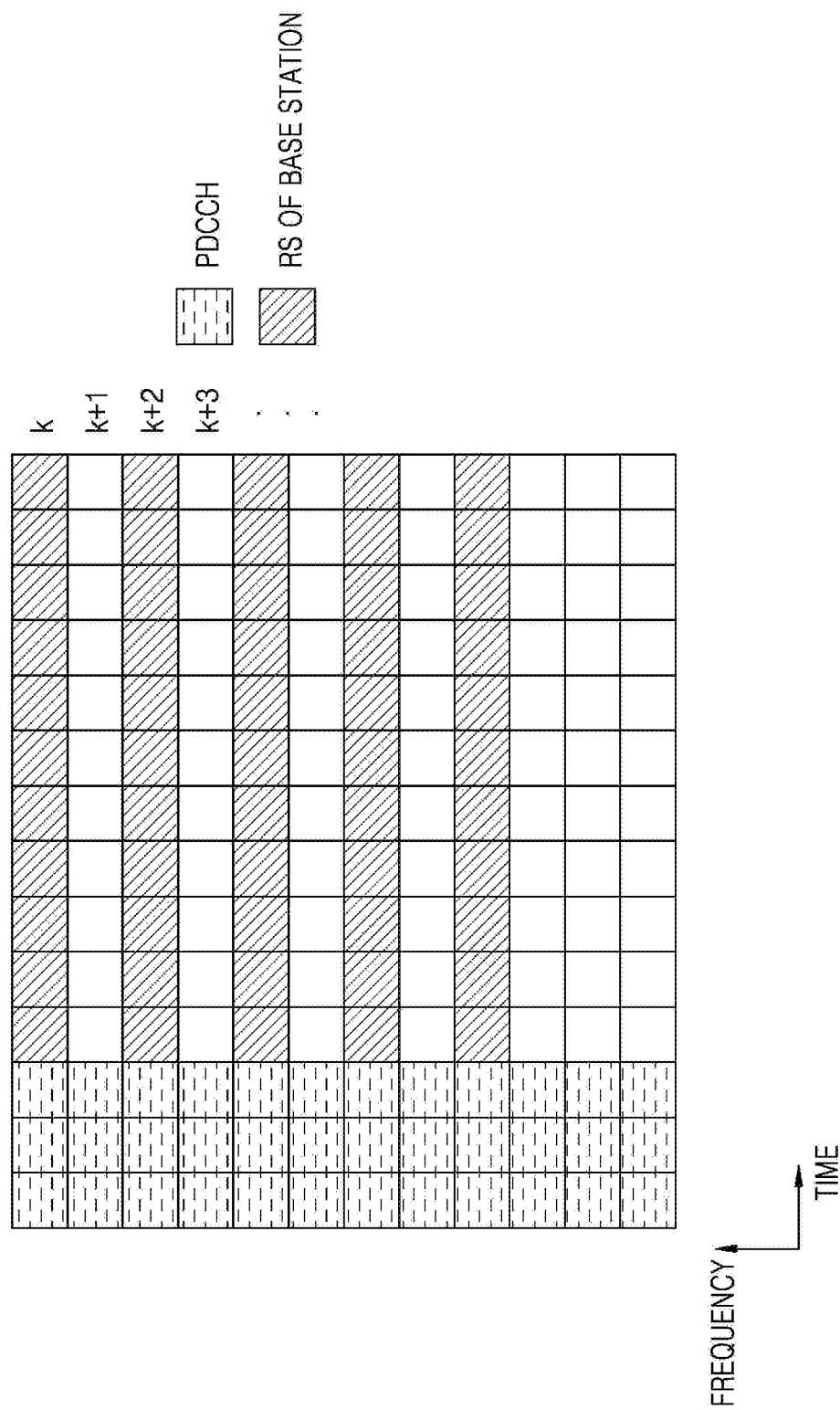
FIG. 12 illustrates a second example of a resource configuration of a reference signal transmitted from a base station according to at least one example embodiment.

FIG. 12 illustrates a second example of a resource configuration of a reference signal transmitted from the base station 110 according to at least one example embodiment.

Referring to FIG. 12, a reference signal transmitted from the base station 110 may include a plurality of subcarriers that is spaced apart at equal intervals. Although FIG. 12 illustrates an example in which the interval between subcarriers (based on a subcarrier index) is 2, it is provided as an example only. For example, the interval between subcarriers (based on the subcarrier index) may be a natural number of 3 or more. If the reference signal includes the plurality of subcarriers as illustrated in FIG. 12, a matrix representing a channel through which subcarrier signals pass may be represented as Vandermonde matrix. Accordingly, a calculation may be easily performed by applying a super resolution algorithm, such as, for example, a MUSIC algorithm, a MinNorm algorithm, and ESPRIT algorithm.

Referring again to FIG. 9, in operation S140, the UE 130 may acquire a snapshot vector by performing an FFT on the received reference signal. The UE 130 may acquire a plurality of snapshot vectors by shifting an FFT window. The UE 130 may acquire the plurality of snapshot vectors by shifting the FFT window in a time domain based on a minimum time unit $T_s$ that is determined based on a sampling rate. For example, a valid period of a symbol is 2048 $T_s$ based on the LTE standard, the UE 130 may acquire 2048 snapshot vectors in a valid period of a single symbol. As described above, each of subcarrier waveform of a reference signal continues in a symbol boundary, the UE 130 may acquire a large number of snapshot vectors by variously changing, that is, shifting a position of the FFT window. That is, the UE 130 may acquire a large number of snapshot vectors. The large number of snapshot vectors may be used to perform a high resolution algorithm.

In operation S150, the UE 130 may calculate a covariance matrix using the plurality of snapshot vectors. During this process, the UE 130 may use the plurality of snapshot vectors acquired by performing the FFT at different points in times. In operation S160, the UE 130 may calculate an eigenvalue and an eigenvector of the covariance matrix. The UE 130 may calculate an eigenvector belonging to a noise subspace or a null subspace in which an eigenvalue is close to 0 or corresponds to 0.

In operation S170, the UE 130 may acquire a value of a target parameter, for example, a MUSIC algorithm, using the eigenvector calculated in operation S160. The target parameter may include a latency of the reference signal, a phase rotation of the reference signal, etc.

However, it is provided as an example only. The UE 130 may determine, as the value of the target parameter, a parameter value that satisfies a predetermined condition by changing the parameter value for a predetermined equation. In operation S180, the UE 130 may report to the base station 110 about information about the determined value of the target parameter. Although FIG. 9 illustrates an example in which operations S150, S160, and S170 are performed by the UE 130, it is provided as an example only. For example, to reduce load of the UE 130, the UE 130 may forward, to the base station 110, information about the plurality of snapshot vectors acquired in operation S140. Operations S150, S160, and S170 may be performed by the base station 110.

The UE 130 may receive a reference signal from a plurality of base stations. The UE 130 may estimate a position of the UE 130 based on a difference in ToA between reference signals received from the plurality of base stations. As another example, the UE 130 may estimate a position of the UE 130 based on a phase difference between reference signals received from the plurality of base stations. As described above, a reference signal used for position estimation may be referred to as a positioning reference signal (PRS). However, it is provided as an example only. The reference signal may be used for synchronization between the base station and the UE 130, or synchronization between the base stations. Hereinafter, a positioning method using a positioning reference signal is described.

Figure 13:
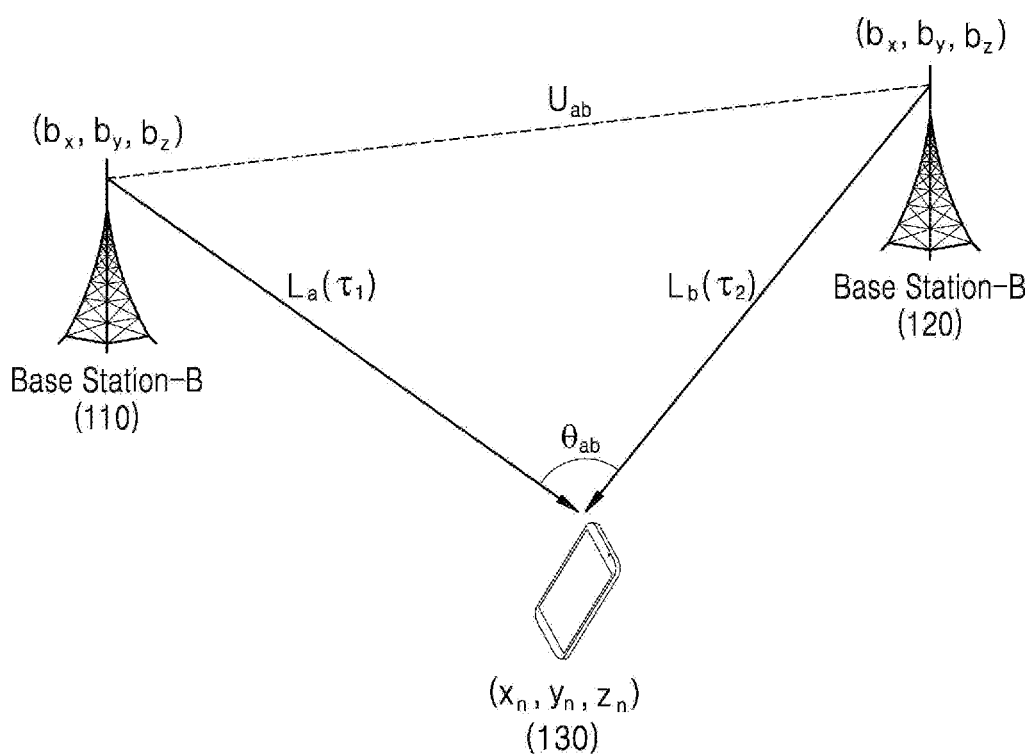
FIG. 13 illustrates an example of performing a positioning method according to at least one example embodiment.

FIG. 13 illustrates an example of performing a positioning method according to at least one example embodiment.

Referring to FIG. 13, the UE 130 may receive a first reference signal from a first base station (base station-A) 110. The UE 130 may measure a point in time at which the first reference signal is received. As another example, the UE 130 may measure a phase of arrival of the first reference signal. The UE 130 may receive a second reference signal from a second base station (base station-B) 120. The UE 130 may measure a point in time at which the second reference signal is received. As another example, the UE 130 may measure a phase of arrival of the second reference signal. The UE 130 may measure a difference in ToA or phase of arrival between the first reference signal and the second reference signal. Although FIG. 13 illustrates two base stations, it is provided as an example only. For example, the UE 130 may receive reference signals from three or more base stations and may measure a difference in ToA or phase of arrival between the received reference signals.

The first base station 110 and the second base station 120 may transmit continuous PRS symbols at the substantially same point in time based a promised point in time or a promised time interval. One of the first and second base stations 110 and 120 may receive a PRS from the other base station and may perform time synchronization based on the received PRS. For example, the first base station 110 may receive a second PRS transmitted from the second base station 120 and may calculate a synchronization error between the first base station 110 and the second base station 120 by applying a high resolution latency estimation method and the like. The first base station 110 may perform the time synchronization with the second base station 120 based on the calculated synchronization error.

The first base station 110 may be positioned at a position separate from the UE 130 by $L_a$. The second base station 120 may be positioned at a position separate from the UE 130 by $L_b$. The first base station 110 may transmit a first PRS to the UE 130, and the second base station 120 may transmit the second PRS to the UE 130. A difference between the distance between the second base station 120 and the UE 130 and the distance between the first base station 110 and the UE 130 may be $L_b-L_a$. If it is converted to a time difference, $t_b-t_a$. Here, $t_a=L_a/3\times10^8$ m and $t_b=L_b/3\times10^8$ m. If the first and second base stations 110 and 120 transmit the first and second PRS symbols at the same time, the first PRS symbol and the second PRS symbol may arrive at the UE 130 at a time difference of $(t_b-t_a)$. Here, it is assumed that synchronization between the first base station 110 and the second base station 120 is sufficiently performed. Unless the synchronization between the first base station 110 and the second base station 120 is sufficiently performed, the first base station 110 or the second base station 120 may measure an offset indicating an inter-synchronization error and may transmit the measured offset information to the UE 130. The UE 130 may correct an arrival point in time of the first PRS symbol or the second PRS symbol based on the offset information.

The UE 130 may secure in advance information about a position of the first base station 110 and a position of the second base station 120. Accordingly, the UE 130 may measure a difference in ToA between the first PRS symbol and the second PRS symbol and may calculate coordinates $(x_n, y_n, z_n)$ of the position of the UE 130 using an algorithm, for example, trilateration. However, it is provided as an example only. The UE 130 may also calculate coordinates ($x_n$, $y_n$, $z_n$) of the position of the UE 130 based on a difference in phase of arrival between the first PRS and the second PRS.

To further accurately measure a difference in ToA or a difference in phase of arrival between PRSs, the UE 130 may acquire a plurality of snapshot vectors. The UE 130 may use the plurality of snapshot vectors to calculate a time domain cross-correlation or a frequency domain shift amount. In a conventional PRS configuration, if the FFT window of the UE 130 is deviated from a boundary between symbols, the performance may be degraded. Also, to overcome interference between signals transmitted from adjacent base stations, the UE 130 needs to receive a plurality of PRS symbols and to increase a reception gain. Accordingly, radio resources may be ineffectively operated.

However, as described above, if the first base station 110 or the second base station 120 generates a reference signal, the reference signal may be transmitted using a plurality of continuous symbols. Accordingly, radio resources may be efficiently used. Also, since the reference signal continues in a boundary between adjacent symbols, the UE 130 may acquire a large number of pieces of sample data (e.g., snapshot vectors) by variously shifting a position of the FFT window. Also, although the FFT window is deviated from the boundary between symbols, the performance may not be degraded.

Figure 14:
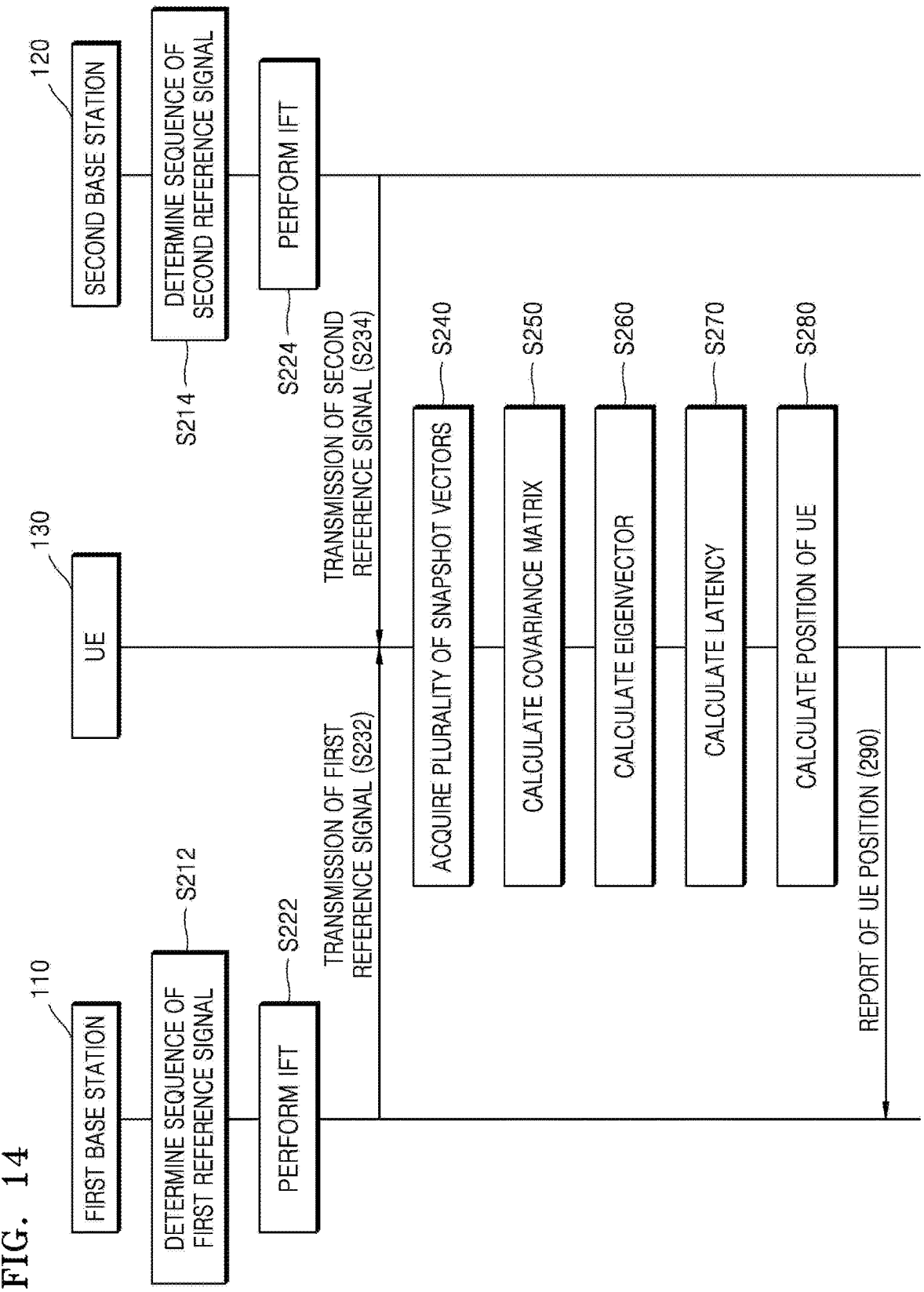
FIG. 14 is a flowchart illustrating an example of a positioning method of a UE according to at least one example embodiment.

FIG. 14 is a flowchart illustrating an example of a positioning method of a UE according to at least one example embodiment.

Referring to FIG. 14, in operation S212, the first base station 110 may determine a sequence of a first reference signal. The first reference signal may be a first PRS. In operation S214, the second base station 120 may determine a sequence of a second reference signal. The second reference signal may be a second PRS. The first base station 110 and the second base station 120 may determine sequences of the first and second reference signals such that the first and second reference signals may continue in a boundary between adjacent symbols.

In operation S222, the first base station 110 may perform an IFT based on the sequence of the first reference signal. In operation S224, the second base station 120 may perform the IFT based on the sequence of the second reference signal.

In operation S232, the first base station 110 may transmit the first reference signal. The first base station 110 may transmit the first reference signal through a plurality of continuous symbols. The first reference signal may continue in the boundary between adjacent symbols. The first reference signal may include a plurality of subcarriers. The first reference signal may include a plurality of subcarriers included in a first set.

In operation S234, the second base station 120 may transmit the second reference signal. The second base station 120 may transmit the second reference signal through a plurality of continuous symbols. The second reference signal may continue in a boundary between adjacent symbols. The second reference signal may include a plurality of subcarriers. The second reference signal may include a plurality of subcarriers included in a second set.

The first set and the second set may be in a disjoint relationship. That is, the first set and the second set may be disjoint sets. A subcarrier included in the first set and a subcarrier included in the second set may be orthogonal to each other. That is, a subcarrier included in the first reference signal and a subcarrier included in the second reference signal may differ from each other. Accordingly, when the UE 130 receives the first reference signal and the second reference signal, interference between the first reference signal and the second reference signal may decrease.

Figure 15:
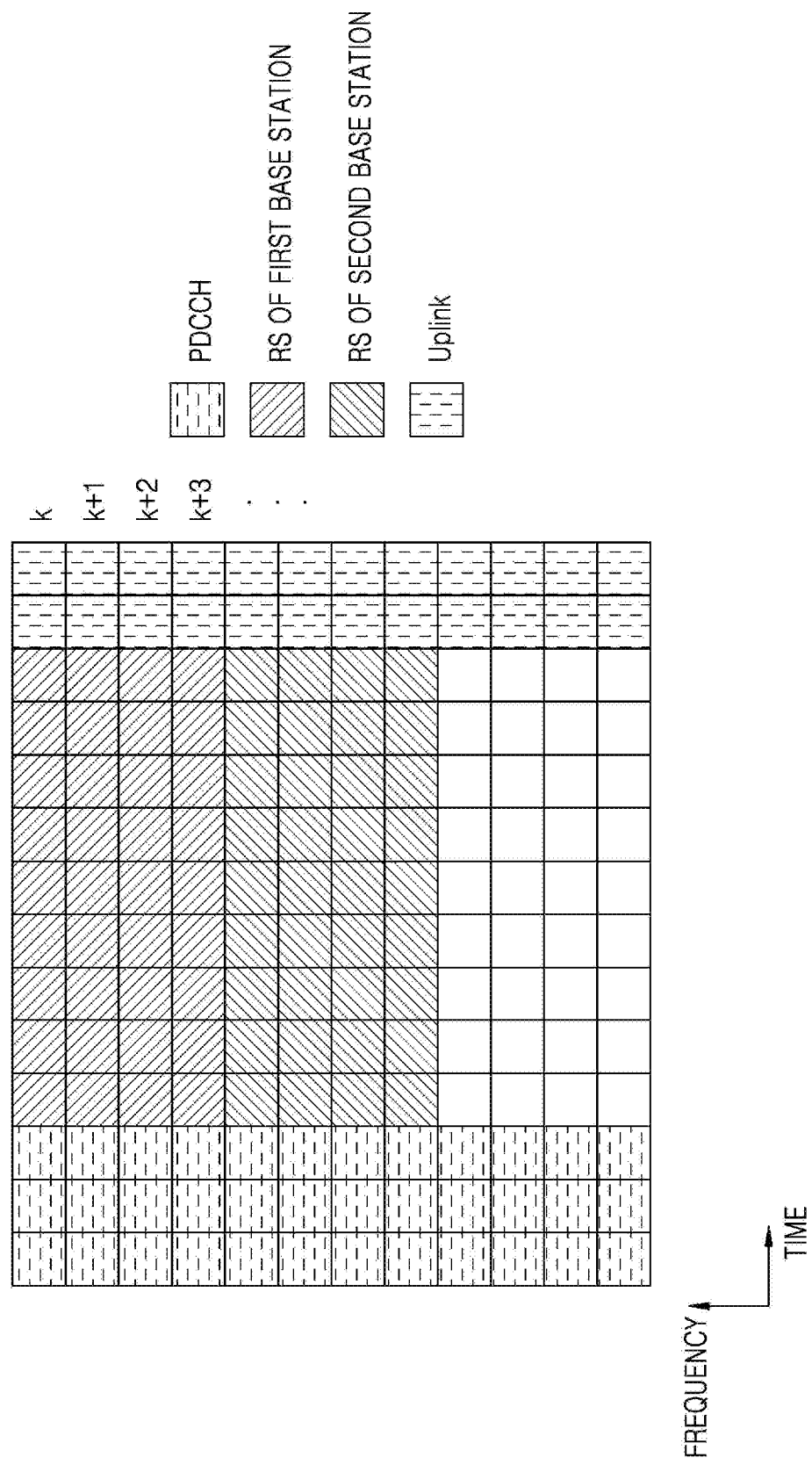
FIG. 15 illustrates a first example of a resource configuration of a first reference signal and a second reference signal according to at least one example embodiment.

FIG. 15 illustrates a first example of a resource configuration of a first reference signal and a second reference signal according to at least one example embodiment.

Referring to FIG. 15, physical downlink control channel (PDCCH) signals are transmitted in three symbols present on the left and a reference signal may not be transmitted from two symbols on the right to prevent interference with an uplink signal. A resource configuration of a PDCCH signal and a resource configuration of an uplink signal shown in FIG. 15 are provided as an example only and not construed as being limiting. For example, a duration for the uplink signal may be omitted as illustrated in FIGS. 16 to 21.

Referring to FIG. 15, a first set may include k-th, (k+1)-th, (k+2)-th, and (k+3)-th subcarriers, and a second set may include (k+4)-th, (k+5)-th, (k+6)-th, and (k+7)-th subcarriers. The first set and the second set may be disjoint sets. Also, a number of subcarriers included in the first set may be equal to a number of subcarriers included in the second set. An interval between the subcarriers included in the first set may be equal to an interval between the subcarriers included in the second set. In FIG. 15, the number of subcarriers included in the first set may be 4 and the interval between the subcarriers of the first set may be 1 (based on a subcarrier index). Likewise, the number of subcarriers included in the second set may be 4 and the interval between the subcarriers of the second set may be 1 (based on a subcarrier index). As described above, although the first set and the second set are disjoint sets, the number of subcarriers included in the first set and the interval between the subcarriers of the first set may be equal to the number of subcarriers included in the second set and the interval between the subcarriers of the second set. In this case, by calculating a covariance matrix, dimensions of covariance matrices of different base stations may be matched. Also, all of the covariance matrices of different base stations may be represented as Vandermonde matrices. Since the interval between the subcarriers of the first set is equal to the interval between the subcarriers of the second set, geometric progressions included in the Vandermonde matrices may have the same common ratio.

Figure 16:
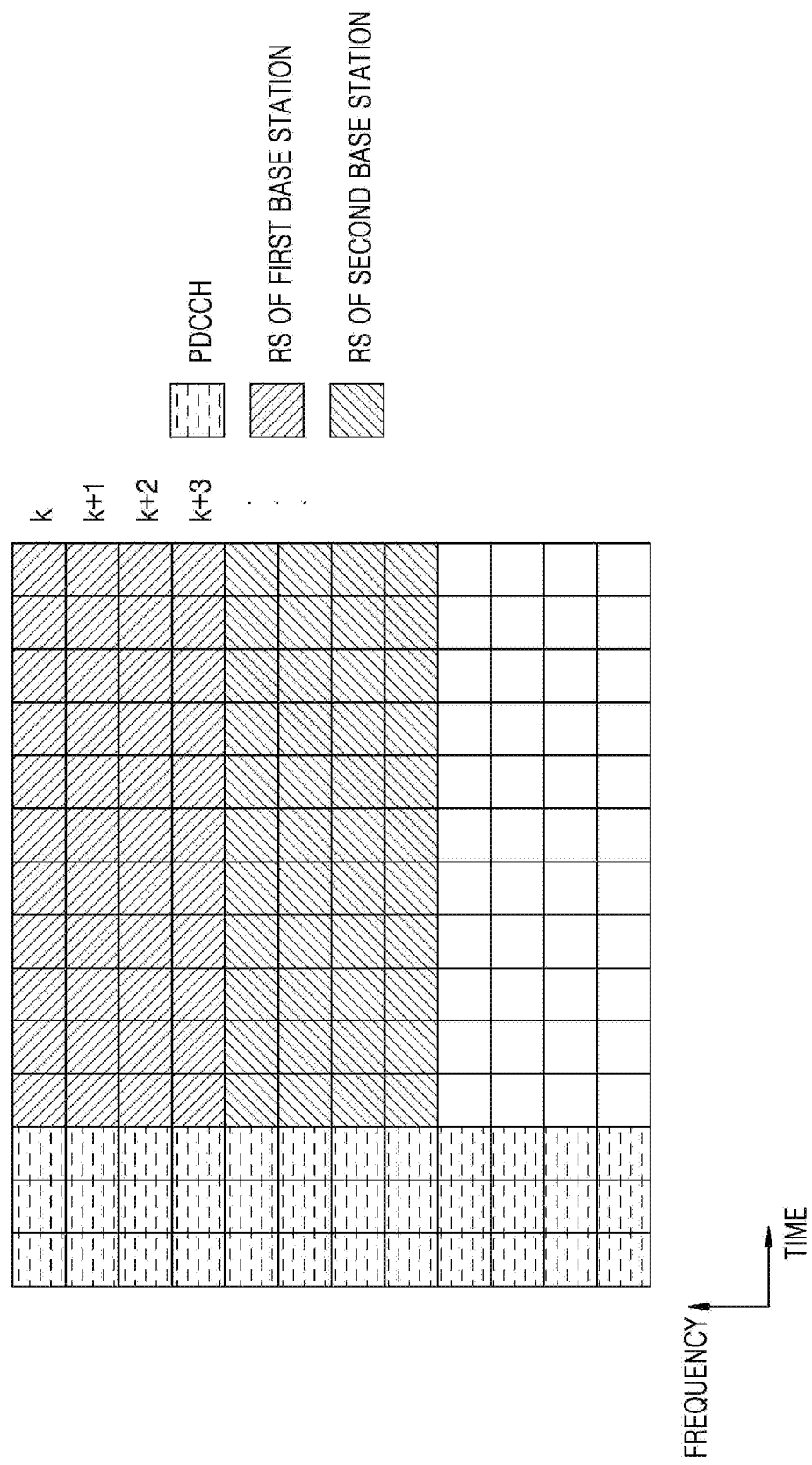
FIG. 16 illustrates a second example of a resource configuration of a first reference signal and a second reference signal according to at least one example embodiment.

FIG. 16 illustrates a second example of a resource configuration of a first reference signal and a second reference signal according to at least one example embodiment.

Referring to FIG. 16, PDCCH signals are transmitted in three symbols present on the left and a symbol section in which a transmission of a reference signal is limited for transmission of an uplink signal may be omitted, which differs from the first example of FIG. 15. Accordingly, the first and second base stations 110 and 120 may transmit a reference signal through two symbols present on the right.

Figure 17:
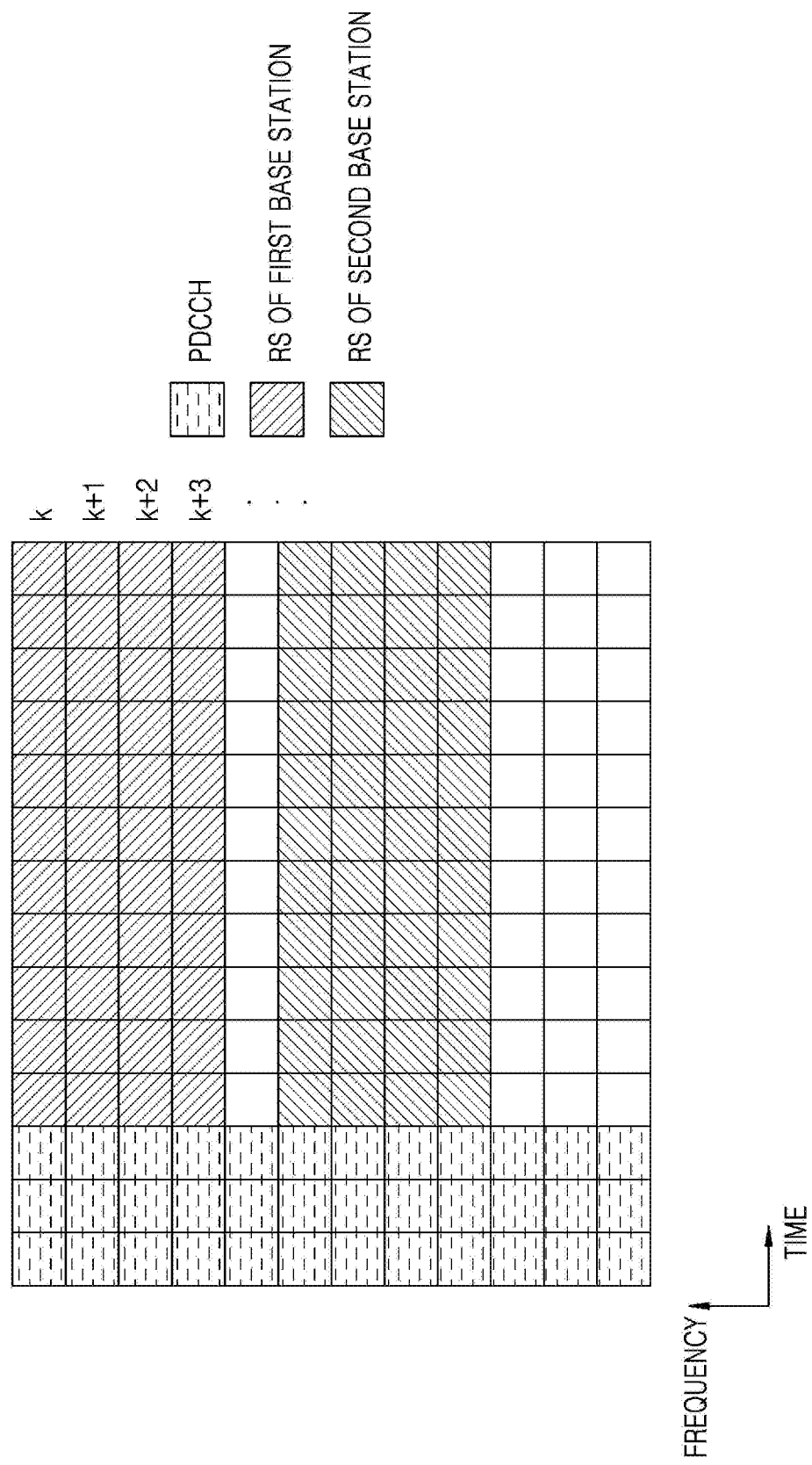
FIG. 17 illustrates a third example of a resource configuration of a first reference signal and a second reference signal according to at least one example embodiment.

FIG. 17 illustrates a third example of a resource configuration of a first reference signal and a second reference signal according to at least one example embodiment.

Referring to FIG. 17, a first set may include k-th, (k+1)-th, (k+2)-th, and (k+3)-th subcarriers, and a second set may include (k+5)-th, (k+6)-th, (k+7)-th, and (k+8)-th subcarriers. Here, the first set and the second set may not be adjacent to each other, which differs from the first and second examples of FIGS. 15 and 16. A number of subcarriers included in the first set may be equal to a number of subcarriers included in the second set. The first set and the second set may be disjoint sets. An interval between the subcarriers included in the first set may be 1 (based on a subcarrier index) and an interval between the subcarriers included in the second set may be 1.

Figure 18:
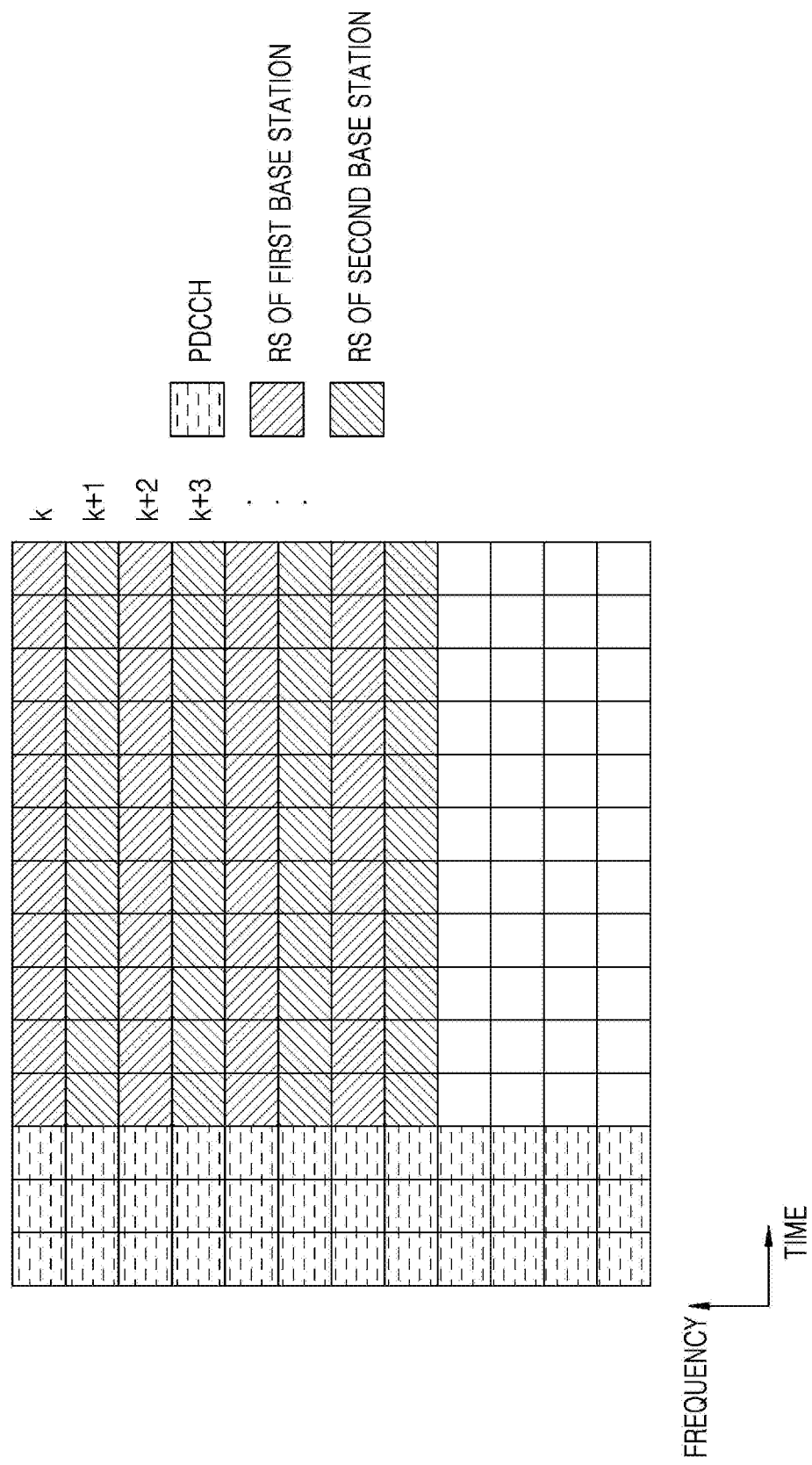
FIG. 18 illustrates a fourth example of a resource configuration of a first reference signal and a second reference signal according to at least one example embodiment.

FIG. 18 illustrates a fourth example of a resource configuration of a first reference signal and a second reference signal according to at least one example embodiment.

Referring to FIG. 18, a first set may include k-th, (k+2)-th, (k+4)-th, and (k+6)-th subcarriers, and a second set may include (k+1)-th, (k+3)-th, (k+5)-th, and (k+7)-th subcarriers. A number of subcarriers included in the first set may be equal to a number of subcarriers included in the second set. The first set and the second set may be disjoint sets. An interval between the subcarriers included in the first set may be 2 (based on a subcarrier index), and an interval between the subcarriers included in the second set may be 2.

The first and second base stations 110 and 120 may transmit reference signals, for example, PRS, using continuous symbols based on a plurality of subcarrier sets that is provided at equal intervals in a comb form. In the case of transmitting a PRS symbol by aligning the plurality of subcarriers at equal intervals, a covariance matrix may be acquired by applying a Hermitian multiplication between frequency domain samples. Therefore, a high resolution latency calculation algorithm may be easily applied using the same. Here, based on a latency calculation method to be applied, the first base station 110 or the second base station 120 may also transmit a reference signal using subcarriers that are provided not at equal intervals but in another form.

Figure 19:
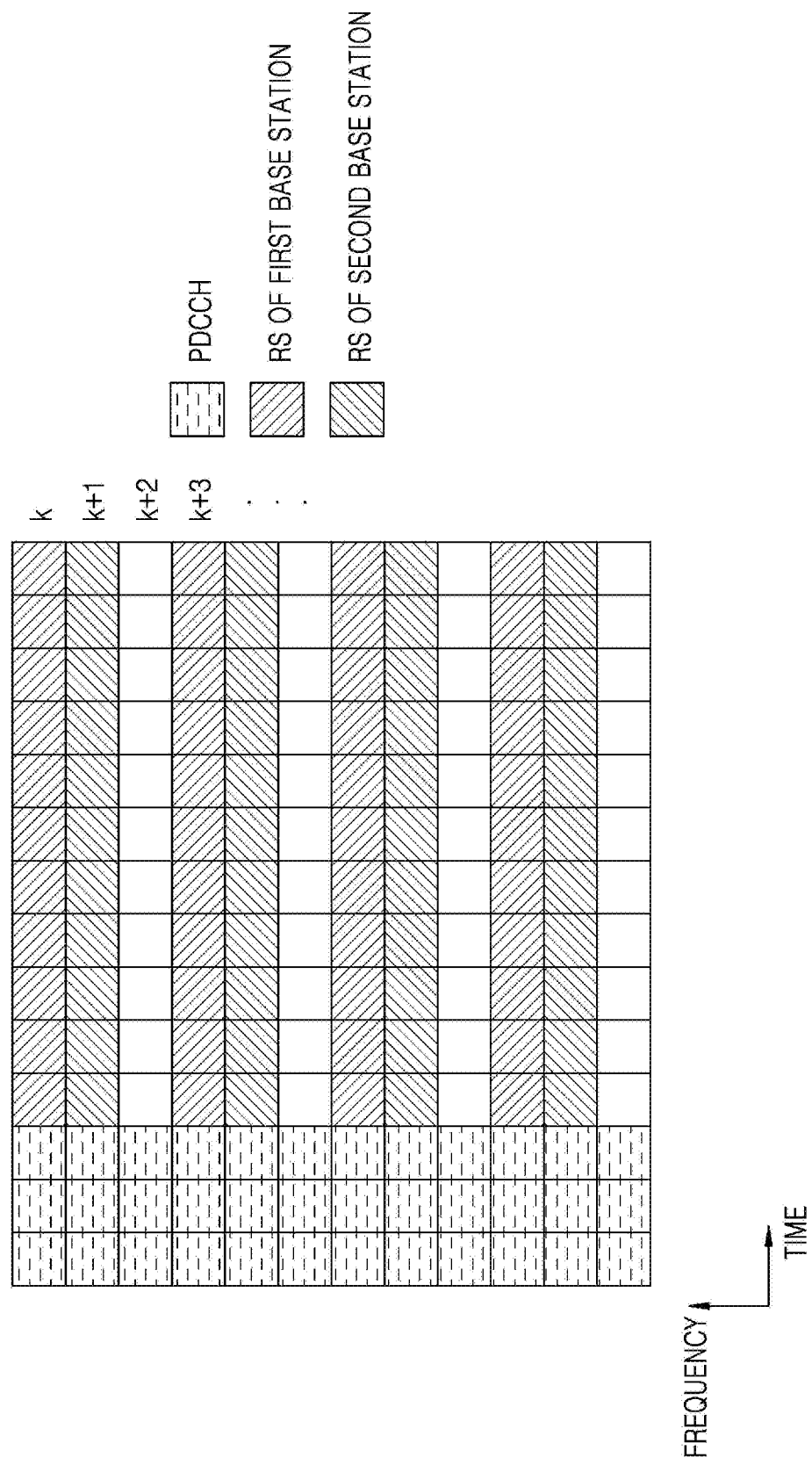
FIG. 19 illustrates a fifth example of a resource configuration of a first reference signal and a second reference signal according to at least one example embodiment.

FIG. 19 illustrates a fifth example of a resource configuration of a first reference signal and a second reference signal according to at least one example embodiment.

Referring to FIG. 19, a first set may include k-th, (k+3)-th, (k+6)-th, and (k+9)-th subcarriers, and a second set may include (k+1)-th, (k+4)-th, (k+7)-th, and (k+10)-th subcarriers. A number of subcarriers included in the first set may be equal to a number of subcarriers included in the second set. The first set and the second set may be disjoint sets. An interval between the subcarriers included in the first set may be 3 (based on a subcarrier index), and an interval between the subcarriers included in the second set may be 3.

Figure 20:
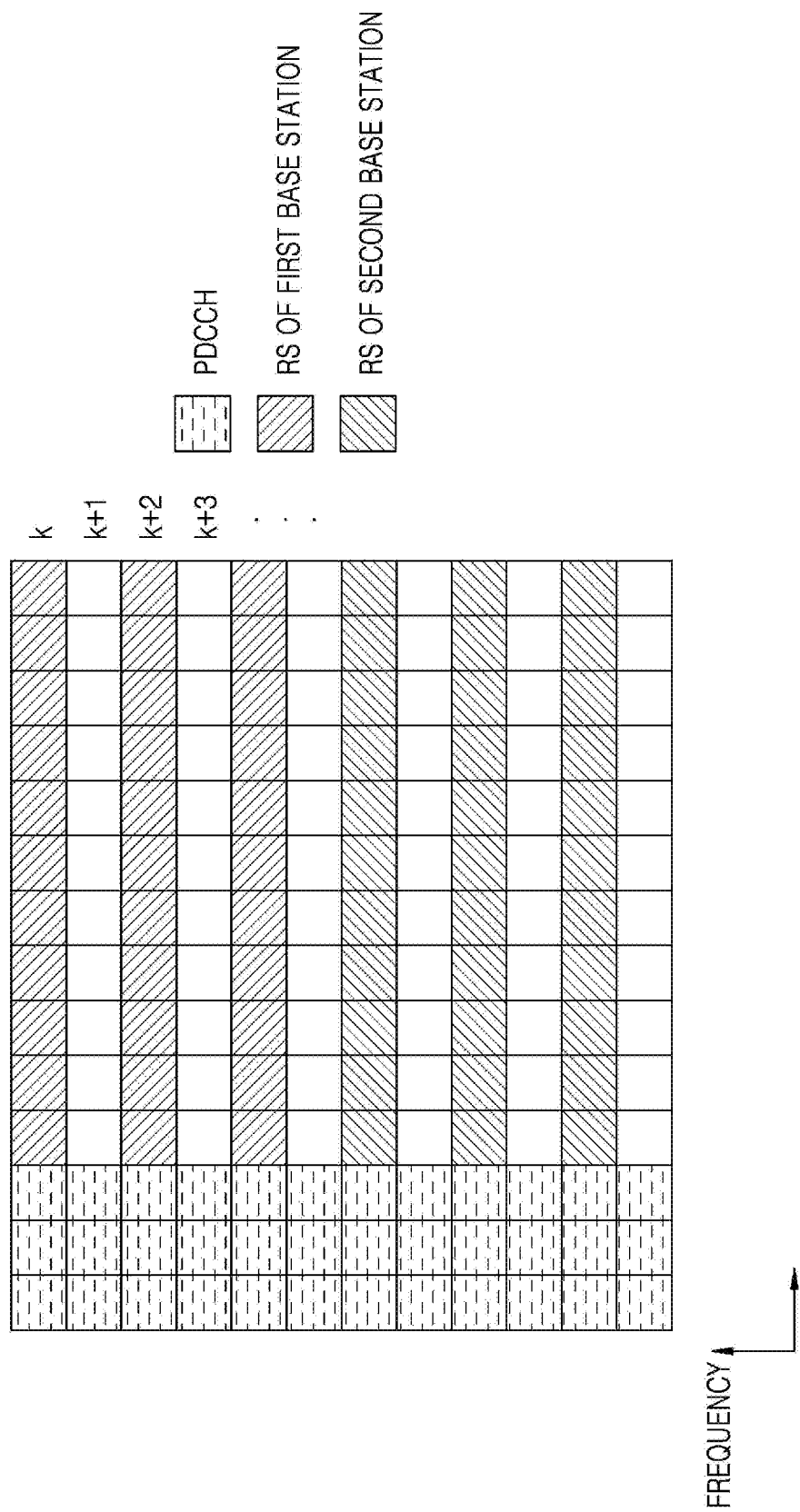
FIG. 20 illustrates a sixth example of a resource configuration of a first reference signal and a second reference signal according to at least one example embodiment.

FIG. 20 illustrates a sixth example of a resource configuration of a first reference signal and a second reference signal according to at least one example embodiment.

Referring to FIG. 20, a first set may include k-th, (k+2)-th, and (k+4)-th subcarriers, and a second set may include (k+6)-th, (k+8)-th, and (k+10)-th subcarriers. Here, a number of subcarriers included in the first set may be equal to a number of subcarriers included in the second set, for example, 3 subcarriers. The first set and the second set may be disjoint sets. An interval between the subcarriers included in the first set may be 2 (based on a subcarrier index), and an interval between the subcarriers included in the second set may be 2.

Figure 21:
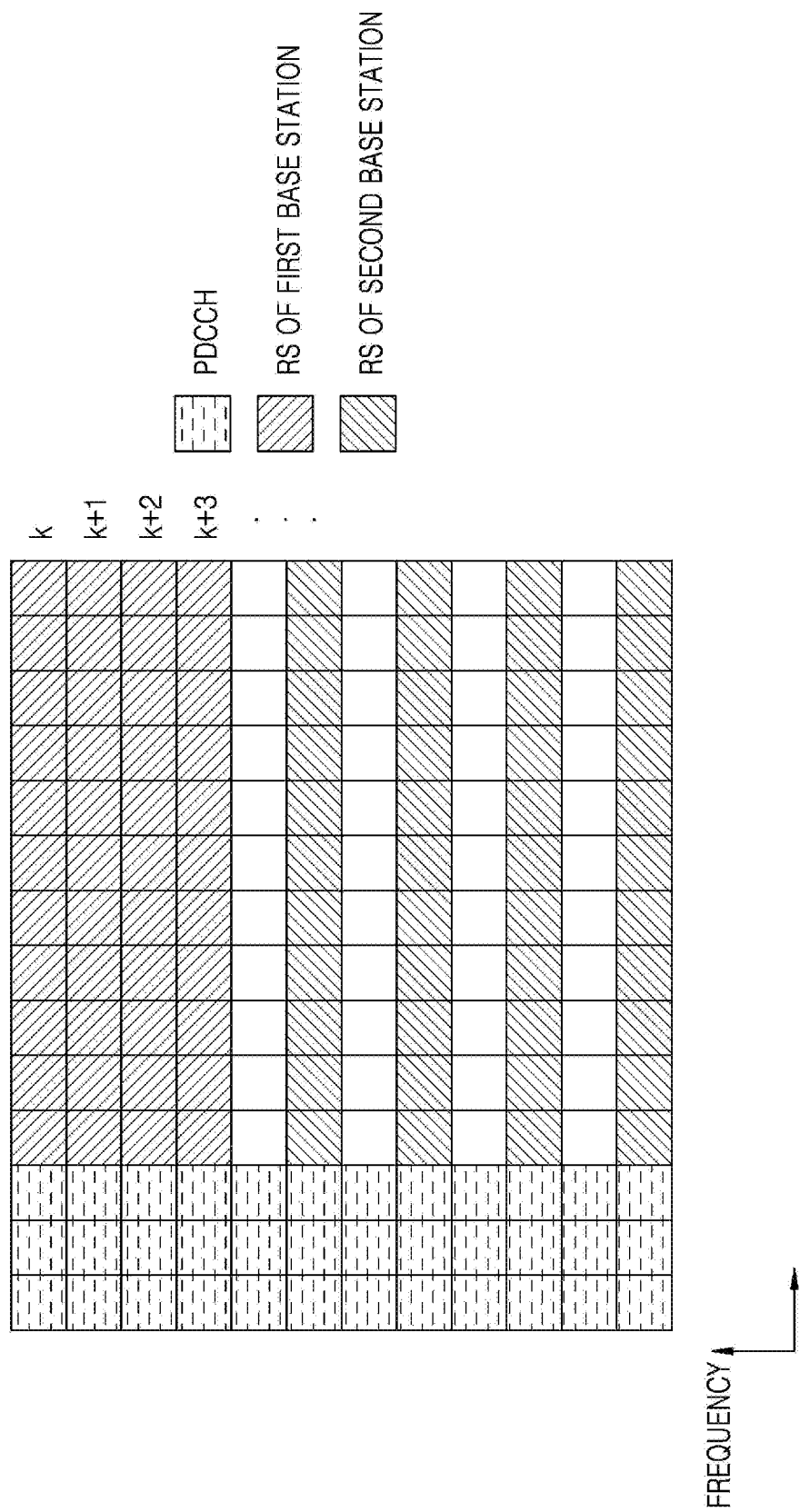
FIG. 21 illustrates a seventh example of a resource configuration of a first reference signal and a second reference signal according to at least one example embodiment.

FIG. 21 illustrates a seventh example of a resource configuration of a first reference signal and a second reference signal according to at least one example embodiment.

Referring to FIG. 21, a first set may include k-th, (k+1)-th, (k+2)-th, and (k+3)-th subcarriers, and a second set may include (k+5)-th, (k+7)-th, (k+9)-th, and (k+11)-th subcarriers. Here, the same number (e.g., 4) of subcarriers may be included in each of the first set and the second set. Therefore, although the first set and the second set are disjoint sets, the number of subcarriers included in the first set may be equal to the number of subcarriers included in the second set. Accordingly, dimensions of covariance matrices or autocorrelation matrices of different base stations may match. Here, an interval (e.g., 2 based on a subcarrier index) between the subcarriers included in the second set may differ from an interval (e.g., 1 based on a subcarrier index) between the subcarriers included in the first set, which differs from the first to sixth examples of FIGS. 15 to 20. In this case, a common ratio of a geometric progression included in a covariance matrix (Vandermonde matrix) of the first base station 110 may differ from a ratio of a geometric progress included in a covariance matrix (Vandermonde matrix) of the first base station 110.

Here, subcarrier configurations of FIGS. 15 to 21 are provided as examples only. For example, if a subcarrier spacing is 15 kHz, the first base station 110 or the second base station 120 may transmit a reference signal including k subcarriers for easy reference signal generation. Here, k denotes an even number. In this case, since the same reference signal pattern of 0.5 msec duration may be repeated, a system configuration may be simplified.

Referring again to FIG. 14, in operation S240, the UE 130 may acquire a plurality of snapshot vectors by shifting an FFT window. The UE 130 may acquire a plurality of snapshot vectors for the first reference signal and may also acquire a plurality of snapshot vectors for the second reference signal. Although the aforementioned example embodiment is described based on the FFT, it is provided as an example only. For example, the UE 130 may extract phase information or waveform information of a frequency domain for each of the subcarriers included in the reference signal using a sliding discrete Fourier transform (DFT) filter, a peak filter, and the like.

Figure 22:
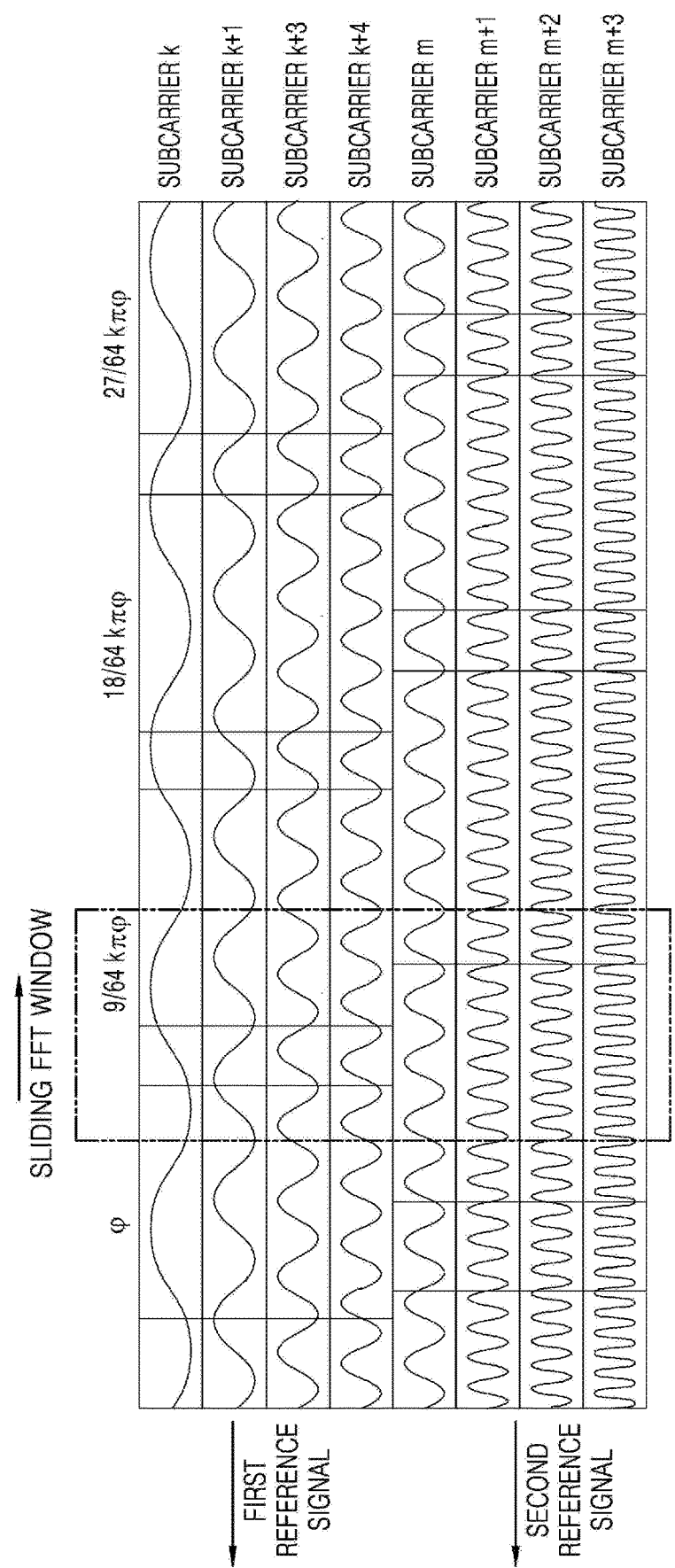
FIG. 22 illustrates an example in which a UE acquires a plurality of snapshot vectors by shifting a position of an FFT window according to at least one example embodiment.

FIG. 22 illustrates an example in which the UE 130 acquires a plurality of snapshot vectors by shifting a position of an FFT window according to at least one example embodiment.

Referring to FIG. 22, the UE 130 may acquire a plurality of snapshot vectors by sliding the FFT window. The UE 130 may slide the FFT window based on a basic time unit $T_s$. For example, the UE 130 may slide the FFT window based on a unit of 1 $T_s$. In this case, if a subcarrier spacing is 15 kHz, the UE 130 may acquire 2048 pieces of sample data, for example, snapshot vectors by sliding the FFT window based on a unit of 1 $T_s$ within a valid period of a single symbol.

The UE 130 may slide the FFT window based on a time unit greater than 1 $T_s$. For example, the UE 130 may slide the FFT window based on a unit of 2 $T_s$. The UE 130 may slide the FFT window based on a unit of 3 $T_s$. The UE 130 may slide the FFT window based on a unit of m×$T_s$. The UE 130 may secure a large number of pieces of sample data, for example, snapshot vectors, and may extract waveform information, phase information, time of arrival (ToA) information, etc., of a subcarrier included in a reference signal based on the secured sample data.

Since first and second reference signals are transmitted through a plurality of continuous symbols, the UE 130 may acquire a sufficient number of pieces of sample data by sliding the FFT window. Accordingly, although a difference between a ToA of the first reference signal and a ToA of the second reference signal is great, the UE 130 may acquire a sufficient number of pieces of sample data (e.g. snapshot vectors) in a plurality of symbol periods, which may lead to enhancing a reception gain and a latency estimation performance.

To apply a MUSIC algorithm, the UE 130 may calculate a covariance matrix based on the plurality of snapshot vectors acquired in operation S240. For clarity, description is made based on the assumption that the UE 130 applies the MUSIC algorithm to the first reference signal received from the first base station 110.

A baseband sample phase component of a reference signal, for example, a PRS, transmitted from the first base station 110 at a time t may be represented as a vector according to Equation 14.

$$X_a(t)=[e^{i\omega_1 t}\ e^{i\omega_2 t}\ \ldots\ e^{i\omega_m t}]^T \quad \text{[Equation 14]}$$

In Equation 14, $X_a(t)$ denotes the baseband sample phase component of the reference signal transmitted from the first base station 110 at the time t. For convenience, initial phase and amplitude components are omitted.

With the assumption that a signal transmitted from the first base station 110 arrives at the UE 130 by passing through a channel of which channel delay by multipath is $[\tau_{a1}, \tau_{a2} \ldots \tau_{al}]$, the channel may be represented as Equation 15.

[Equation 15]

$$H_a = \begin{bmatrix} H_a(\omega_1) \\ H_a(\omega_2) \\ \vdots \\ H_a(\omega_m) \end{bmatrix} =$$

$$\begin{bmatrix} h_1^a e^{-i\omega_1 \tau_{a1}} + h_2^a e^{-i\omega_1 \tau_{a2}} + h_3^a e^{-i\omega_1 \tau_{a3}} + \ldots & h_l^a e^{-i\omega_1 \tau_{al}} \\ h_1^a e^{-i\omega_2 \tau_{a1}} + h_2^a e^{-i\omega_2 \tau_{a2}} + h_3^a e^{-i\omega_2 \tau_{a3}} + \ldots & h_l^a e^{-i\omega_2 \tau_{al}} \\ \vdots \\ h_1^a e^{-i\omega_m \tau_{a1}} + h_2^a e^{-i\omega_m \tau_{a2}} + h_3^a e^{-i\omega_m \tau_{a3}} + \ldots & h_l^a e^{-i\omega_m \tau_{al}} \end{bmatrix}$$

In Equation 15, $[h_1^a, h_2^a, h_3^a, \ldots, h_l^a]$ denotes a size component for each multipath of the channel $H_a$. For example, $h_1^a$ denotes a size component of a path with the channel delay of $\tau_{a1}$. If the first base station 110 includes subcarriers that are spaced apart at equal intervals as described above with reference to FIGS. 15 to 21, the channel matrix $H_a$ may be represented as Vandermonde matrix that is configured as a geometric progression of an initial term of each row. For example, the channel matrix $H_a$ may be represented as Equation 16.

$$H_a = \begin{bmatrix} e^{-i\omega_1 \tau_{a1}} & e^{-i\omega_1 \tau_{a2}} & \ldots & e^{-i\omega_1 \tau_{al}} \\ e^{-i\omega_2 \tau_{a1}} & e^{-i\omega_2 \tau_{a2}} & \ldots & e^{-i\omega_2 \tau_{al}} \\ \vdots & \vdots & \ddots & \vdots \\ e^{-i\omega_m \tau_{a1}} & e^{-i\omega_m \tau_{a2}} & \ldots & e^{-i\omega_m \tau_{al}} \end{bmatrix} \begin{bmatrix} h_1^a \\ h_2^a \\ \vdots \\ h_l^a \end{bmatrix} \quad \text{[Equation 16]}$$

$$= [a(\tau_{a1}) a(\tau_{a2}) \ldots a(\tau_{al})] \begin{bmatrix} h_1^a \\ h_2^a \\ \vdots \\ h_l^a \end{bmatrix}$$

In Equation 16, a column vector $a(\tau_{an})$, $n=1, \ldots l$ may be represented as a geometric progression since an interval between subcarriers is constant. The column vector $a(\tau_{an})$ may be represented as Equation 17.

$$a(\tau_{an}) = [e^{-i\omega_1 \tau_{an}}\ e^{-i\omega_2 \tau_{an}}\ \ldots\ e^{-i\omega_m \tau_{an}}]^T = e^{-i\omega_1 \tau_{an}}$$
$$[e^{-2\pi \cdot r \cdot \tau_{an}}\ e^{-2\pi \cdot 2r \cdot \tau_{an}}\ e^{-i2\pi \cdot 3r \cdot \tau_{an}} \ldots e^{-i2\pi \cdot mr \cdot \tau_{an}}]^T \quad \text{[Equation 17]}$$

Referring to Equation 17, components of $a(\tau_{an})$ may satisfy a geometric progression with a common ratio of $e^{-i2\pi \cdot r \cdot \tau_{an}}$. Here, r denotes an interval between subcarriers. A matrix in a Vandermonde form may regard each column vector component as a steering vector that is applied in a frequency estimation algorithm or an angle of arrival (AOA) estimation algorithm and may apply a subspace frequency estimation method using, for example, a MUSIC algorithm.

A frequency domain subcarrier sample of the first base station 110 that is restored by the UE 130 at a time t is $Y_a(t)$, which may be referred to as a snapshot vector. The snapshot vector $Y_a(t)$ may be represented as Equation 18.

$$Y_a(t)=[y_{\omega 1}(t)\ y_{\omega 2}(t)\ \ldots\ y_{\omega m}(t)]^T = H_a \cdot X_a(t) \quad \text{[Equation 18]}$$

In S250, the UE 130 may calculate a covariance matrix or an autocorrelation matrix using the snapshot vector $Y_a(t)$ acquired for a plurality of time t values by shifting the FFT window. The UE 130 may calculate an expectation value matrix $R_{yy}$ by averaging the covariance matrices or autocorrelation matrices using the snapshot vectors acquired for the plurality of time t values. $R_{yy}$ may be represented as Equation 19.

$$R_{yy}=E[Y_a Y_a^H]=E[H_a \cdot X_a \cdot X_a^H \cdot H_a^H]=H_a \cdot R_{xx} \cdot H_a^H \quad \text{[Equation 19]}$$

An eigenvalue and an eigenvector of $R_{yy}$ may be represented as Equation 20.

$$R_{yy} q_i = \lambda_i q_i \quad \text{[Equation 20]}$$

In Equation 20, $q_i$ denotes an i-th eigenvector of $R_{yy}$ and $\lambda_i$ denotes an i-th eigenvalue. The eigenvalue $\lambda_i$ denotes a power component of a multipath. Here, an eigenvalue of which a numerical value is low, converges to zero, or corresponds to zero may be an absent signal, that is, noise. Accordingly, the MUSIC algorithm may apply to eigenvectors that belong to a noise subspace or a null subspace. An equation of applying the MUSIC algorithm may be represented as Equation 21.

$$P_{music}(\tau_{a1}) = \sum_i \frac{1}{|a^H(\tau_{a1}) q_i|^2} \quad \text{[Equation 21]}$$

In S270, the UE 130 may estimate a latency component of the multipath by finding $\tau_{a1}$ that maximizes $P_{music}(\tau_{a1})$ of Equation 21 through scanning. In a multipath environment, a plurality of path delays may maximize the above MUSIC algorithm. Here, the UE 130 may select a value of a first path that arrives with a maximum power and minimum delay and may use the selected value as a value proximate to actual latency between the UE 130 and the first base station 110. According to the aforementioned method, the UE 130 may remove the effect of delay spread by the multipath and may enhance the accuracy of time estimation. The UE 130 may apply other super resolution latency methods and other frequency domain phase different measurement based latency estimation methods, such as, for example, MinNorm and ESPRIT algorithms, in addition to the aforementioned MUSIC algorithm.

In operation S280, the UE 130 may calculate position information of the UE 130 based on a difference between the latency calculated for the first base station 110 and the latency calculated for the second base station 120. In operation S290, the UE 130 may report, that is, transmit position information of the UE 130 to the first base station 110 or the second base station 120.

Although FIG. 14 illustrates an example in which operations S250 to S280 are performed by the UE 130, it is provided as an example only. For example, the UE 130 may transmit information about the plurality of snapshot vectors acquired in operation S240 to the first base station 110 or the second base station 120. The first base station 110 or the second base station 120 may perform operations S250 to S280 based on the plurality of snapshot vectors.

A method and apparatus of transmitting a reference signal according to example embodiments is described above with reference to FIGS. 1 to 22. Also, a positioning method of a UE using a reference signal is described. According to at least one example embodiment, although an FFT window is deviated from a boundary between symbols, it is possible to prevent a degradation in reference signal analysis performance. According to at least one example embodiment, a UE may acquire a sufficient number of pieces of sample data in a plurality of continuous symbol periods. According to at least one example embodiment, a UE may easily perform a high resolution algorithm by acquiring a sufficient number of pieces of sample data.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processes having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A reference signal transmission method performed by at least one base station, the method comprising:
   determining a sequence of a reference signal;
   performing an inverse Fourier transform (IFT) based on the determined sequence of the reference signal; and
   transmitting a reference signal generated by performing the IFT through a plurality of continuous symbols,
   wherein the reference signal includes at least one subcarrier signal,
   wherein the sequence of the reference signal is determined to satisfy a condition that each of at least one subcarrier signal included in the reference signal continues in a boundary between adjacent two symbols.

2. The method of claim 1, wherein the sequence of the reference signal satisfies a condition that a phase of a sequence of an l-th symbol is shifted by $$2\pi k \cdot \frac{T_{CP,\ell-1}}{T_u}$$

compared to a phase of a sequence of an (l−1)-th symbol, where l denotes a predetermined natural number,
   k denotes a subcarrier index,
   $T_{CP,l-1}$ denotes a length of a cyclic prefix (CP) duration of the (l−1)-th symbol, and
   $T_u$ denotes a length of a valid period of a symbol.

3. The method of claim 1, wherein the sequence of the reference signal satisfies the following equation:

$$X_{s,\ell}[k] = (-1)^{s \cdot k} \varphi_{init}^k \cdot \exp\left(2\pi j k \cdot \ell \cdot \frac{T_{cp}}{T_u}\right)$$

wherein $\varphi_{init}^k$ denotes a frequency domain complex number representing an initial phase and amplitude of a k-th subcarrier of an initial symbol of an initial slot,
   $X_{s,l}[k]$ denotes a frequency domain complex number representing an initial phase and amplitude of a k-th subcarrier of an l-th symbol of an s-th slot,
   $T_{cp}$ denotes a length of a CP duration, and
   $T_u$ denotes a length of a valid period of a symbol.

4. The method of claim 1, wherein the sequence of the reference signal satisfies the following equation:

$$X_{s,\ell}[k] = (-1)^{s \cdot k \cdot \delta(\mu)} \varphi_{init}^k \cdot \exp\left(2\pi j k \cdot P \cdot \frac{T_{cp}}{T_u}\right),$$

$$P = \ell \bmod (7 \cdot 2^\mu), \mu = 0, 1, 2, 3 \ldots$$

where $\varphi_{init}^k$ denotes a frequency domain complex number representing an initial phase and amplitude of a k-th subcarrier of an initial symbol of an initial slot,
   $X_{s,l}[k]$ denotes a frequency domain complex number representing an initial phase and amplitude of a k-th subcarrier of an l-th symbol of an s-th slot,
   $T_{cp}$ denotes a length of a CP duration,
   $T_u$ denotes a length of a valid period of a symbol, and
   μ denotes a new radio (NR) numerology number that determines a subcarrier spacing.

5. The method of claim 1, wherein, when an extended CP is used, the sequence of the reference signal satisfies the following equation:

$$X_{s,\ell}[k] = (-1)^{s \cdot k} \varphi_{init}^k \cdot \exp\left(2\pi j k \cdot \ell \cdot \frac{T_{cp}}{T_u}\right), \text{ in } LTE$$

$$X_{s,\ell}[k] = \varphi_{init}^k \cdot \exp\left(2\pi j k \cdot \ell \cdot \frac{T_{cp}}{T_u}\right) \text{ in } 5GNR$$

where μ denotes a parameter that determines a subcarrier spacing,
   $\varphi_{init}^k$ denotes a frequency domain complex number representing an initial phase and amplitude of a k-th subcarrier of an initial symbol of an initial slot,
   $X_{s,l}[k]$ denotes a frequency domain complex number representing an initial phase and amplitude of a k-th subcarrier of an l-th symbol of an s-th slot,
   $T_{cp}$ denotes a length of a CP duration,
   $T_u$ denotes a length of a valid period of a symbol, and
   μ denotes an NR numerology number that determines a subcarrier spacing.

6. The method of claim 1, wherein the reference signal comprises a plurality of subcarriers signals, and
   frequency components of the plurality of subcarrier signals are determined to satisfy a condition that a matrix representing a channel through which the plurality of subcarrier signals passes becomes a Vandermonde matrix.

7. The method of claim 6, wherein the plurality of subcarrier signals is adjacent to each other or spaced apart at equal intervals in a frequency domain.

8. The method of claim 1, wherein the at least one base station includes a first base station and a second base station, the first base station is configured to transmit a first reference signal including a plurality of subcarriers included in a first set, the second base station is configured to transmit a second reference signal including a plurality of subcarriers included in a second set, and the first set and the second set are disjoint sets.

9. The method of claim 8, wherein a number of the plurality of subcarriers included in the first set is identical to a number of the plurality of subcarriers included in the second set.

10. The method of claim 9, wherein the first set includes the plurality of subcarriers spaced apart from each other at first intervals, and the second set includes the plurality of subcarriers spaced apart from each other at second intervals.

11. A method performed by a user equipment (UE), the method comprising:

receiving a reference signal from at least one base station during a plurality of continuous symbol periods; and acquiring a plurality of snapshot vectors by shifting a fast Fourier transform (FFT) window within the plurality of continuous symbol periods, wherein the reference signal is generated based on a sequence that is determined to satisfy a condition that each of at least one subcarrier signal included in the reference signal continues in a boundary between adjacent two symbols.

12. The method of claim 11, wherein the plurality of snapshot vectors is acquired by shifting a start point of the FFT window by an integer multiple of a basic time unit within the plurality of continuous symbol periods.

13. The method of claim 12, further comprising:

calculating a covariance matrix using the plurality of snapshot vectors.

14. The method of claim 13, further comprising:

calculating an eigenvector set of the covariance matrix, determining an eigenvector included in a noise subspace or a null space from the eigenvector set, and calculating a latency between the at least one base station and the UE based on the determined eigenvector.

15. The method of claim 14, wherein the at least one base station includes a first base station and a second base station, and a first latency between the first base station and the UE is calculated, a second latency between the second base station and the UE is calculated, and a position of the UE is calculated based on the first latency and the second latency.

16. The method of claim 11, wherein the sequence of the reference signal satisfies a condition that a phase of a sequence of an l-th symbol is shifted by $$2\pi k \cdot \frac{T_{CP,\ell-1}}{T_u}$$

compared to a phase of a sequence of an (l−1)-th symbol, where l denotes a predetermined natural number, k denotes a subcarrier index, $T_{CP,l-1}$ denotes a length of a CP duration of the (l−1)-th symbol, and $T_u$ denotes a length of a valid period of a symbol.

17. The method of claim 11, wherein the sequence of the reference signal satisfies the following equation:

$$X_{s,\ell}[k] = (-1)^{s \cdot k} \varphi_{init}^k \cdot \exp\left(2\pi jk \cdot \ell \cdot \frac{T_{cp}}{T_u}\right)$$

where $\varphi_{init}^k$ denotes a frequency domain complex number representing an initial phase and amplitude of a k-th subcarrier of an initial symbol of an initial slot, $X_{s,l}[k]$ denotes a frequency domain complex number representing an initial phase and amplitude of a k-th subcarrier of an l-th symbol of an s-th slot, $T_{cp}$ denotes a length of a CP duration, and $T_u$ denotes a length of a valid period of a symbol.

18. The method of claim 11, wherein the sequence of the reference signal satisfies the following equation:

$$X_{s,\ell}[k] = (-1)^{s \cdot k \cdot \delta(\mu)} \varphi_{init}^k \cdot \exp\left(2\pi jk \cdot P \cdot \frac{T_{cp}}{T_u}\right),$$

$$P = \ell \bmod (7 \cdot 2^\mu), \mu = 0, 1, 2, 3 \ldots$$

where $\varphi_{init}^k$ denotes a frequency domain complex number representing an initial phase and amplitude of a k-th subcarrier of an initial symbol of an initial slot, $X_{s,l}[k]$ denotes a frequency domain complex number representing an initial phase and amplitude of a k-th subcarrier of an l-th symbol of an s-th slot, $T_{cp}$ denotes a length of a CP duration, $T_u$ denotes a length of a valid period of a symbol, and μ denotes an NR numerology number that determines a subcarrier spacing.

19. The method of claim 11, wherein, when an extended CP is used, the sequence of the reference signal satisfies the following equation:

$$X_{s,\ell}[k] = (-1)^{s \cdot k} \varphi_{init}^k \cdot \exp\left(2\pi jk \cdot \ell \cdot \frac{T_{cp}}{T_u}\right), \text{ in } LTE$$

$$X_{s,\ell}[k] = \varphi_{init}^k \cdot \exp\left(2\pi jk \cdot \ell \cdot \frac{T_{cp}}{T_u}\right) \text{ in } 5GNR$$

where μ denotes a parameter that determines a subcarrier spacing, $\varphi_{init}^k$ denotes a frequency domain complex number representing an initial phase and amplitude of a k-th subcarrier of an initial symbol of an initial slot, $X_{s,l}[k]$ denotes a frequency domain complex number representing an initial phase and amplitude of a k-th subcarrier of an l-th symbol of an s-th slot, $T_{cp}$ denotes a length of a CP duration, $T_u$ denotes a length of a valid period of a symbol, and μ denotes an NR numerology number that determines a subcarrier spacing.

20. The method of claim 11, wherein the at least one base station includes a first base station and a second base station, a first reference signal that includes a plurality of subcarriers included in a first set is received from the first base station, a second reference signal that includes a plurality of subcarriers included in a second set is received from the second base station, and the first set and the second set are disjoint sets.

* * * * *